(12) United States Patent
Call

(10) Patent No.: US 9,326,655 B2
(45) Date of Patent: May 3, 2016

(54) MULTI-FUNCTION CLEANING APPARATUS

(71) Applicant: Karla Call, Arvada, CO (US)

(72) Inventor: Karla Call, Arvada, CO (US)

(*) Notice: Subject to any disclaimer, the term of this patent is extended or adjusted under 35 U.S.C. 154(b) by 102 days.

(21) Appl. No.: 14/252,589

(22) Filed: Apr. 14, 2014

(65) Prior Publication Data

US 2014/0311524 A1    Oct. 23, 2014

Related U.S. Application Data

(60) Provisional application No. 61/814,102, filed on Apr. 19, 2013, provisional application No. 61/879,027, filed on Sep. 17, 2013, provisional application No. 61/909,165, filed on Nov. 26, 2013.

(51) Int. Cl.
| | |
|---|---|
| *B08B 1/00* | (2006.01) |
| *A47L 13/12* | (2006.01) |
| *A47L 13/11* | (2006.01) |
| *A46B 15/00* | (2006.01) |
| *A47L 13/16* | (2006.01) |
| *A46B 7/04* | (2006.01) |
| *A46B 11/00* | (2006.01) |
| *B60S 3/04* | (2006.01) |

(52) U.S. Cl.
CPC . *A47L 13/12* (2013.01); *A46B 7/04* (2013.01); *A46B 11/0062* (2013.01); *A46B 15/0055* (2013.01); *A47L 13/11* (2013.01); *A47L 13/16* (2013.01); *A46B 7/042* (2013.01); *A46B 7/044* (2013.01); *A46B 11/001* (2013.01); *A46B 2200/3033* (2013.01); *B08B 1/00* (2013.01); *B60S 3/047* (2013.01); *Y10T 29/49826* (2015.01)

(58) Field of Classification Search
CPC .......... A47L 13/12; A46B 7/04; A46B 7/042; A46B 4/044; A46B 15/005; A46B 11/001; A46B 7/044; B60S 3/047; B08B 1/00
See application file for complete search history.

(56) References Cited

U.S. PATENT DOCUMENTS

| | | | |
|---|---|---|---|
| 6,250,833 B1 | 6/2001 | Perry et al. | |
| 6,283,656 B1* | 9/2001 | Jiang | B60S 3/047 15/103 |
| 6,669,391 B2 | 12/2003 | Policicchio et al. | |
| D552,812 S | 10/2007 | Dotterman et al. | |
| 7,832,955 B1* | 11/2010 | Leffew | A46B 11/0055 401/188 R |
| 7,904,987 B2 | 3/2011 | Bayon et al. | |
| 8,109,685 B1* | 2/2012 | Vito | A46B 5/02 401/188 R |
| 8,267,607 B2 | 9/2012 | Harris | |
| 2005/0180807 A1* | 8/2005 | Walsh, III | A47L 1/15 401/131 |
| 2006/0188320 A1* | 8/2006 | Banco | A47L 1/08 401/139 |
| 2007/0077113 A1 | 4/2007 | Nanda | |
| 2007/0234499 A1* | 10/2007 | Thibodeau | B60S 1/46 15/250.01 |
| 2012/0096662 A1* | 4/2012 | Uchiyama | A46B 5/0058 15/160 |
| 2013/0047358 A1* | 2/2013 | Shafer | B25G 1/102 15/114 |
| 2013/0174362 A1* | 7/2013 | Edwards | B60S 3/06 15/53.1 |
| 2014/0013527 A1 | 1/2014 | Molinet et al. | |
| 2014/0311524 A1* | 10/2014 | Call | A47L 13/12 134/6 |

FOREIGN PATENT DOCUMENTS

WO    2013188197 A1    12/2013

* cited by examiner

*Primary Examiner* — Bibi Carrillo
(74) *Attorney, Agent, or Firm* — Holland & Hart LLP

(57) ABSTRACT

A cleaning device includes a refillable handle, a scrubbing member, a plurality of bristles, and a squeegee. The refillable handle includes first and second end portions and a hollow interior configured to hold a cleaning fluid. The scrubbing member is positioned at the first end portion of the handle and arranged in flow communication with the hollow interior. The plurality of bristles are mounted to the handle. The squeegee is mounted to the second end portion of the handle.

24 Claims, 25 Drawing Sheets

MULTI-FUNCTION CLEANING APPARATUS

CROSS-REFERENCE TO RELATED APPLICATION

This application claims the benefit of the filing date of U.S. Provisional Application No. 61/814,102, filed Apr. 19, 2013, entitled MULTI-FUNCTION CLEANING APPARATUS, Provisional Application No. 61/879,027, filed Sep. 17, 2013, entitled CLEANING APPARATUS, and Provisional Application No. 61/909,165, filed Nov. 26, 2013, entitled CLEANING APPARATUS WITH SEALED WAND, the disclosures of which are incorporated, in their entirety, by reference.

TECHNICAL FIELD

The present disclosure is directed to cleaning devices, and more particularly relates to multi-function cleaning devices for cleaning showers, bathtubs and other household spaces.

BACKGROUND

Shower stalls and tubs accumulate a steady build-up of organic and inorganic deposits on their surfaces as a result of repeated use. The accumulation of such deposits, which include insoluble soap curds, washed-off debris from the body partially coated with soap or shampoo, calcium carbonate, other insoluble metal salts, and growth of mildew and microorganisms, etc., creates an unsightly and unhealthy environment that is unacceptable from the standpoint of cleanliness and good hygiene, as well as aesthetics.

Conventionally, the task of cleaning such surfaces has nearly exclusively been accomplished by application of a cleaner and scrubbing by hand. A number of commercially available cleaners are available to consumers for use in cleaning the build-up of deposits in a shower. These cleaners, which typically contain combinations of surfactants, chelating agents, oxidizers, abrasives, and soluble salts, require repeated scrubbing or wiping with the cleaner, followed generally with a water rinse, to periodically remove the unsightly and unhealthy build-up in the shower. Considerable labor is required to maintain a clean shower using these conventional cleaners.

Cleaning the shower is known to be one of the least desirable chores in home care today. In a recent study, out of ten cleaning tasks evaluated, cleaning tubs/showers was rated most disliked by respondents. In fact, the percentage of people ranking 'cleaning tubs/showers' as most disliked was nearly three times higher than the task ranking second most disliked.

Reasons that make cleaning the shower so difficult are the number of cleaning surfaces which need to be addressed and the type of organic and inorganic deposits that build up on these areas. Traditionally, multiple cleaning tools have been needed to tackle the many different surfaces found inside shower stalls. The sheer amount of tools an products needed to clean the confined shower stall makes the task unpleasant, cumbersome and expensive.

With all of the cleaning solutions and tools on the market today, there is still a tremendous need for a product that makes cleaning the shower faster, easier and better. Opportunities exist for improvements in devices and methods for cleaning showers, bathtubs and other household spaces.

SUMMARY

One aspect of the present disclosure relates to a cleaning device that includes a refillable handle, a scrubbing member, a plurality of bristles, and a squeegee. The refillable handle includes first and second end portions and a hollow interior configured to hold a cleaning fluid. The scrubbing member is positioned at the first end portion of the handle and arranged in flow communication with the hollow interior. The plurality of bristles are mounted to the handle. The squeegee is mounted to the second end portion of the handle.

The cleaning device may include a fluid dispenser positioned on the handle and arranged in flow communication with the hollow interior, wherein the fluid dispenser is operable to pump the cleaning fluid into the scrubbing member. The fluid dispenser may be positioned at a location spaced between distal and proximal ends of the handle along an upward facing surface thereof. The scrubbing member may include an abrasive surface and the plurality of bristles extend parallel to the abrasive surface. The fluid dispenser may include a pump member that is removable from the handle to permit refilling the handle with cleaning fluid. The plurality of bristles may be mounted to a bristle base, wherein the bristle base is detachably mounted to the first end portion of the handle.

The fluid dispenser may be positioned on the handle and arranged in flow communication with the hollow interior, wherein the fluid dispenser comprising a spray dispenser having a spray handle operable to pump the cleaning fluid, a nozzle through which the cleaning fluid is dispensed, and a dip stick extending into the hollow interior. The squeegee may be removably mounted to the handle. The squeegee may include a blade support, a blade, support arms, and an opening between the support arms and the blade support, wherein the opening is configured to receive a support member upon which the cleaning device hangs. The scrubbing member may include a rigid base portion releasably mounted to the handle, and at least one sponge member mounted to the rigid base portion. The sponge member may include a contoured peripheral shape and a planar abrasive surface.

Another aspect of the present disclosure relates to a cleaning device that includes a refillable handle, a scrubber assembly, and a squeegee. The handle includes a hollow interior configured to hold a cleaning fluid. The scrubber assembly is removably mounted to the first end of the handle and arranged in flow communication with the hollow interior. The scrubber assembly includes a sponge portion and a bristles portion. The squeegee is mounted to the handle. The pump is mounted to the handle and operable to dispense the cleaning fluid to the scrubber assembly.

The scrubber assembly may include a sponge portion and a bristles portion. The cleaning device may include a fluid dispenser mounted to a second end of the handle and arranged in flow communication with the hollow interior, wherein the fluid dispenser is configured to dispense the cleaning fluid. The bristles portion may include a bristles base and a plurality of bristles mounted to the bristles base, wherein the bristles base is mountable to the handle separate from the sponge portion. The sponge portion may include a sponge base and a sponge member, and the sponge base is mountable to the handle separate from the bristles portion. The sponge portion and the bristles portion may be independently releasably mounted to the handle.

A further aspect of the present disclosure relates to a method of assembling a cleaning device. The method includes providing a cleaning device having a refillable handle having a hollow interior configured to hold a cleaning fluid, a first scrubbing member, a second scrubbing member, and squeegee, releasably mounting the first scrubbing member to a first end of the handle, releasably mounting the second scrubbing member to the first end of the handle, and mounting the squeegee to a second end of the handle.

The method may also include providing a fluid dispenser operable to dispense the cleaning fluid from the cleaning device, and mounting the fluid dispenser to the handle. The first scrubbing member may include a base portion and an abrasive portion, wherein the base portion is releasably mounted to the handle. The second scrubbing member may include a bristles base and a plurality of bristles permanently mounted to the bristles base, wherein the bristles base is removably mounted to the handle. The method may include providing a pump and mounting the pump to the handle, wherein the pump is operable to deliver the cleaning fluid to at least one of the first and second scrubbing members.

Another aspect of the present disclosure relates to a method of cleaning. The method includes providing a cleaning device having a handle configured to hold a cleaning fluid, a scrubber assembly, and a squeegee. The scrubber assembly includes a sponge member and a plurality of bristles. The method includes dispensing the cleaning fluid, scrubbing a surface with the sponge member and the cleaning fluid, scrubbing the surface with the plurality of bristles and the cleaning fluid, and removing the last traces of debris and hard water spots from the surface with the squeegee.

The method may also include providing a fluid dispenser operable to dispense the cleaning fluid, wherein operating the fluid dispenser includes depressing a pump to deliver cleaning fluid to the scrubber assembly. Operating the fluid dispenser may include operating a spray dispenser to spray the cleaning fluid. The method may include refilling the handle with cleaning fluid.

The foregoing and other features, utilities, and advantages of the subject matter described herein will be apparent from the following more particular description of certain embodiments as illustrated in the accompanying drawings.

DETAILED DESCRIPTION

Figure 1:
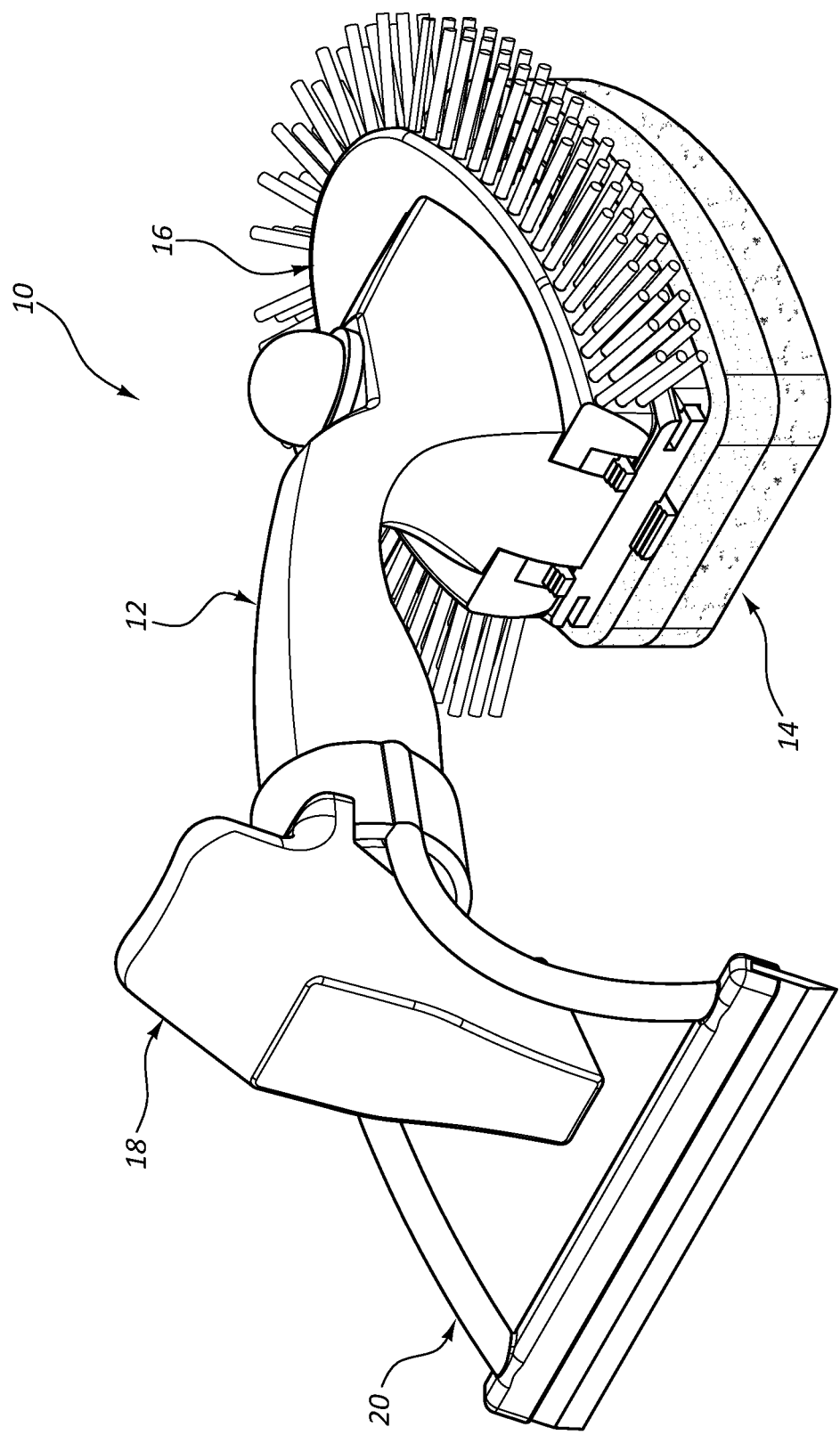
FIG. 1 is a top perspective view of an example cleaning device in accordance with the present disclosure.
Figure 2:
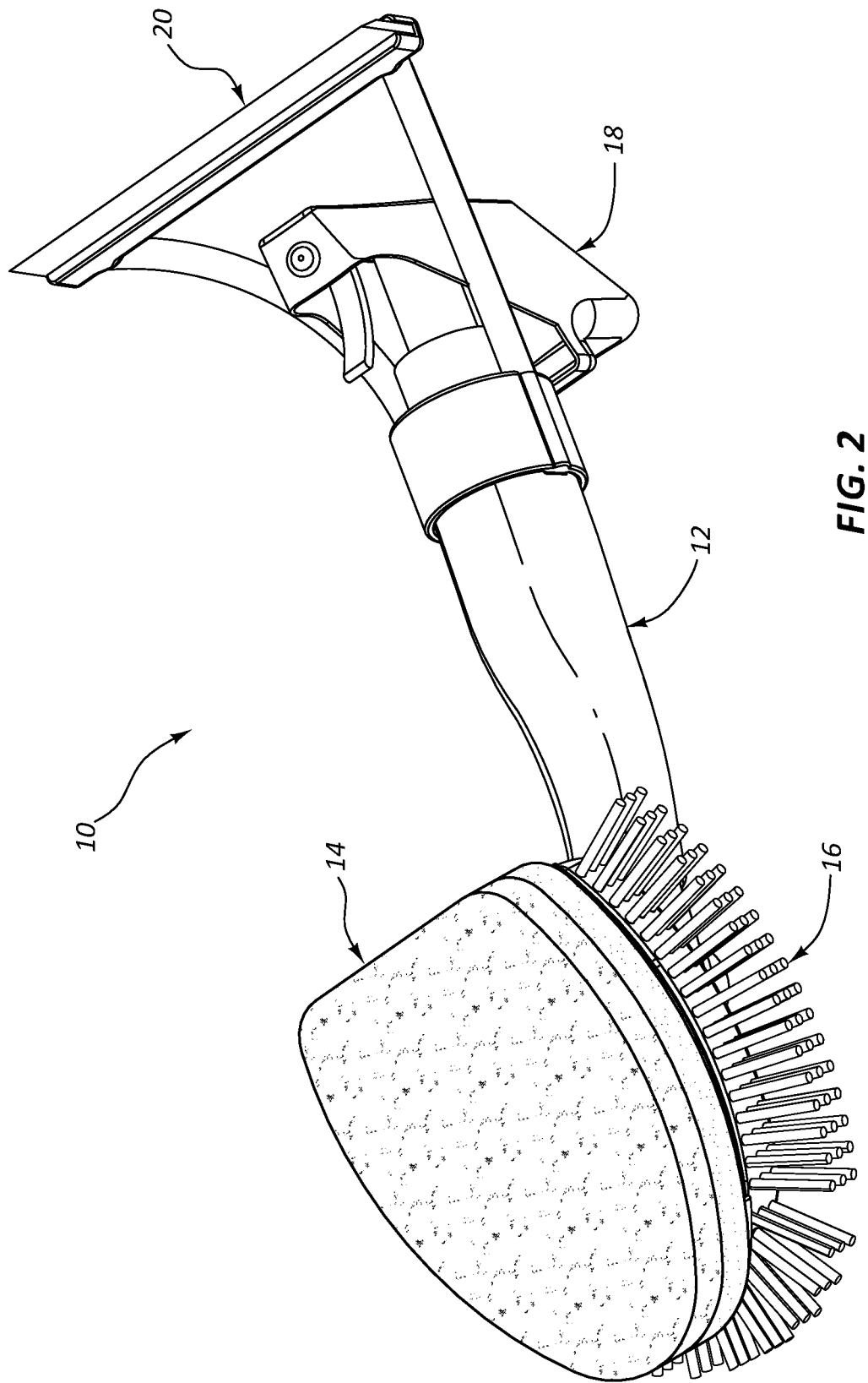
FIG. 2 is a bottom perspective view of the cleaning device of FIG. 1.
Figure 3:
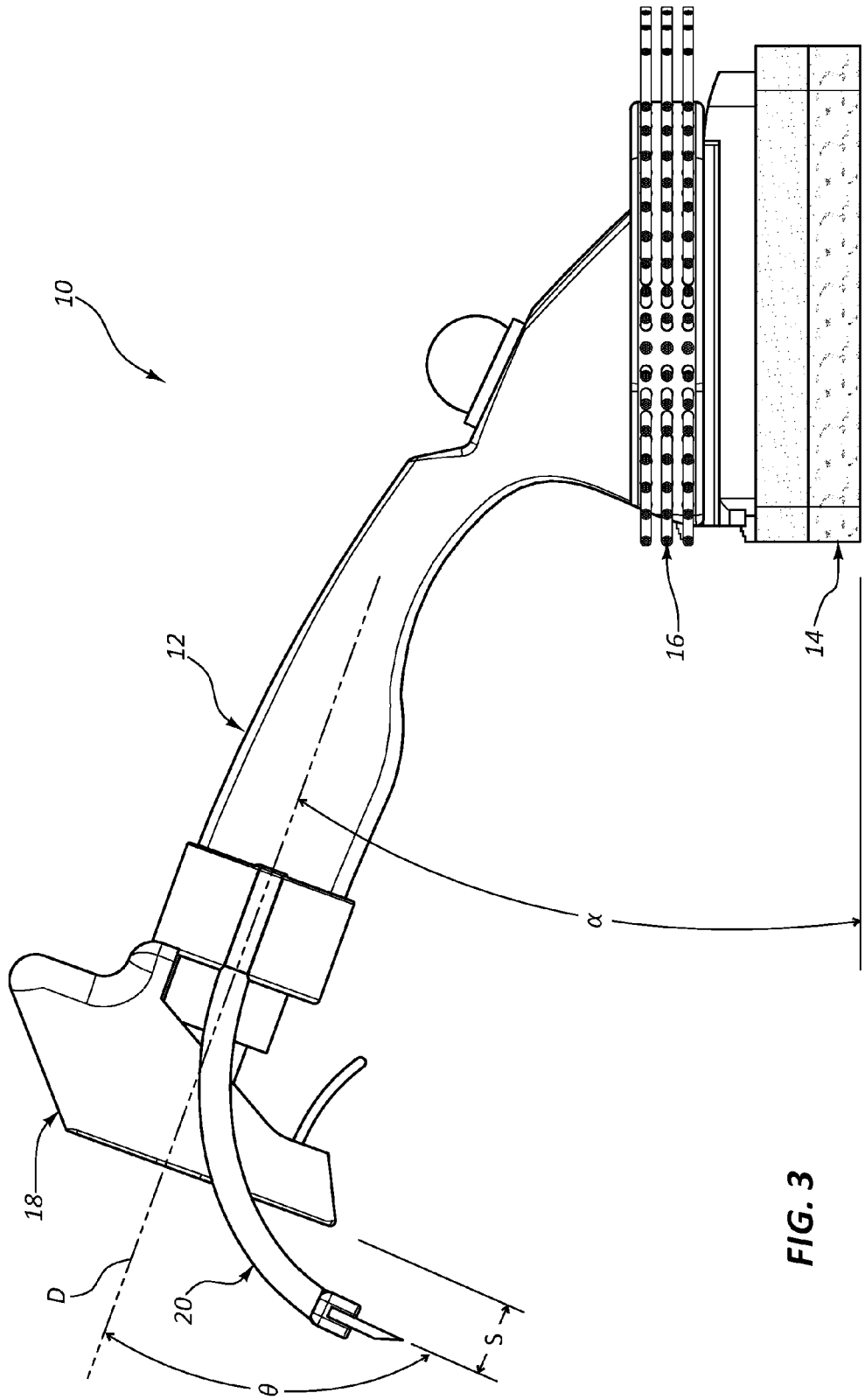
FIG. 3 is a left side view of the cleaning device of FIG. 1.

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

The present disclosure is directed to a cleaning device for use in cleaning household surfaces such as, for example, surfaces of a shower stall, bathtub, sink, toilet, tile floor, countertop or backsplash. The surface to be cleaned may be indoor or outdoor. The cleaning device may include a plurality of features that provide different cleaning functions. The cleaning device may be referred to as a multi-function cleaning device, apparatus or assembly. Various features of the cleaning device may be removably mounted to the cleaning device for purposes of maintenance or providing additional functions and operability of the cleaning device. In some arrangements, various features of the cleaning device may be removed entirely or be adjustable in orientation to customize functionality of the cleaning device. In other arrangements, the features of the cleaning device may be integrally formed to limit adjustability or simplify replacement.

An example cleaning device in accordance with the present disclosure includes a handle member, at least one fluid-dispensing feature, and at least one scrubbing member. The cleaning device may also include a squeegee. The at least one scrubbing member may include a plurality of different scrubbing portions. In one example, the cleaning device includes a first scrubbing member comprising at least one of a foam or sponge portion and an abrasive pad. The other scrubbing member may include a plurality of bristles. The various scrubbing members may have different stiffness and abrasive properties. Furthermore, the scrubbing members may have different shapes, sizes and orientations. For example, an example cleaning device that includes a first scrubbing member in the form of an abrasive pad having an abrasive surface in a first plane. The second scrubbing member may include a plurality of bristles extending radially outward, wherein at least some of the bristles extend in a plane that is parallel to the plane of the abrasive surface of the first scrubbing member. The bristles may be positioned around and extending radially outward from at least a portion of a peripheral surface of the second scrubbing member. The bristles may extend in a plurality of different directions. For example, at least some of the bristles may extend at least partially in a forward direction, while other bristles extend at least partially in a lateral direction, a rearward direction, a vertically upward direction, and/or a vertically downward direction.

The fluid-dispensing, features of the cleaning device may include, for example, a spray dispenser operable to dispense a cleaning fluid in the form of, for example, a liquid or gel. The cleaning device may include a fluid dispenser in addition to or in place of the spray dispenser, which delivers fluid to one of the scrubbing members. For example, the cleaning device may include a fluid pump that creates a flow of cleaning fluid to the sponge or abrasive pad of the first scrubbing member described above. The fluid pump may deliver the cleaning fluid directly into the sponge or abrasive pad. Alternatively, the pump may deposit cleaning fluid adjacent to or on an exterior of the sponge or abrasive pad rather than within the sponge or abrasive pad. In still further examples, the pump may deposit cleaning fluid adjacent to or on bristles of the second scrubbing member described above.

The cleaning device may include the scrubbing features at an opposite end of the handle from at least one of the spray dispenser and squeegee. For example, the spray device may be releasably connected to an open first end of the handle and the scrubbing features are mounted to an opposite end of the handle. The squeegee member may extend from the first end of the handle. Alternatively, the squeegee may be releasably mounted to the handle and be adjustable relative to the spray dispenser and handle. The squeegee may provide, in addition to a squeegee function to remove fluid from a surface to be cleaned, a hanging or hook function that permits mounting the cleaning device to a hook or rack (e.g., a rack, hook, or shelf positioned within a shower stall).

The squeegee may be used to remove cleaning fluid deposited by the spray dispenser, the pump or another cleaning agent used to clean a surface to be cleaned. The squeegee may remove fluids and other deposits left behind after scrubbing a surface to be cleaned with one of the scrubber members of the cleaning device. Alternatively, the squeegee member may be used to simply remove water and soap deposits after taking a shower or bath or removing excess water on a countertop or sink as part of cleaning a surface in situations independent of using the cleaning fluid carried by the cleaning device. In at least some examples, the squeegee is detachable from the cleaning device and may be used independent of the other cleaning device features.

The scrubbing features of the cleaning device may also be releasably attached to the handle. For example, the first scrubbing member, which may include an abrasive pad or sponges as discussed above, may be releasably attached to the handle for the purpose of, for example, replacing a worn-out first scrubbing member with a replacement scrubbing member of the same type, or replacing a scrubbing member with a scrubbing member having different properties (e.g., greater or weaker abrasive properties). Likewise, the second scrubbing member, which may include bristles as discussed above, may be mounted to a base that is releasably mounted to the handle. The second scrubbing member may be replaced for different reasons including, for example, replacing worn-out or missing bristles, or replacing a second scrubbing member with another scrubbing member having different scrubbing properties (e.g., different length, stiffness, orientation, or number of bristles).

In still further examples, the first and second scrubbing members may be integrally formed as a single unit or assembly that is mounted in a single step to the handle member. The cleaning device may be operable using either or both of the first and second scrubbing members. In still further examples, additional types of scrubbing members may be used in place of or in addition to the scrubbing members shown with reference to FIGS. 1-20 described below.

Referring now to FIGS. 1-16, an example cleaning device 10 is shown and described in detail. The cleaning device 10 includes a handle 12, a sponge assembly 14, a bristle assembly 16, a spray dispenser 18, and a squeegee 20. The sponge and bristle assemblies 14, 16 may be referred to as first and second scrubber members, which correlate with the first and second scrubber members described above. The sponge and bristle assemblies 14, 16 may be separably mountable to the handle 12. The spray dispenser 18 and squeegee 20 may extend from an opposite end of the handle as compared to the mounting location of the sponge and bristle assemblies 14, 16. The squeegee 20 and spray dispenser may at least partially overlap or be arranged co-extensive with each other along their lengths. The squeegee 20 may include an open portion through which at least a portion of the spray dispenser extends.

In at least one arrangement, the sponge assembly 14, bristle assembly 16, spray dispenser 18 and squeegee 20 may be removably mounted to the handle 12. At least the sponge assembly 14, bristle assembly 16 and squeegee 20 may be operable independent of the handle 12 and may be replaceable for purposes of maintenance. The sponge assembly 14, bristle assembly 16 and squeegee 20 may be exchanged with a replaceable part that has comparable features having slightly different properties or functionality. In one example, the spray dispenser 18 may be replaced with a simple cap that seals closed an otherwise open end of the handle, which provides access into a hollow interior of the handle.

Figure 9:
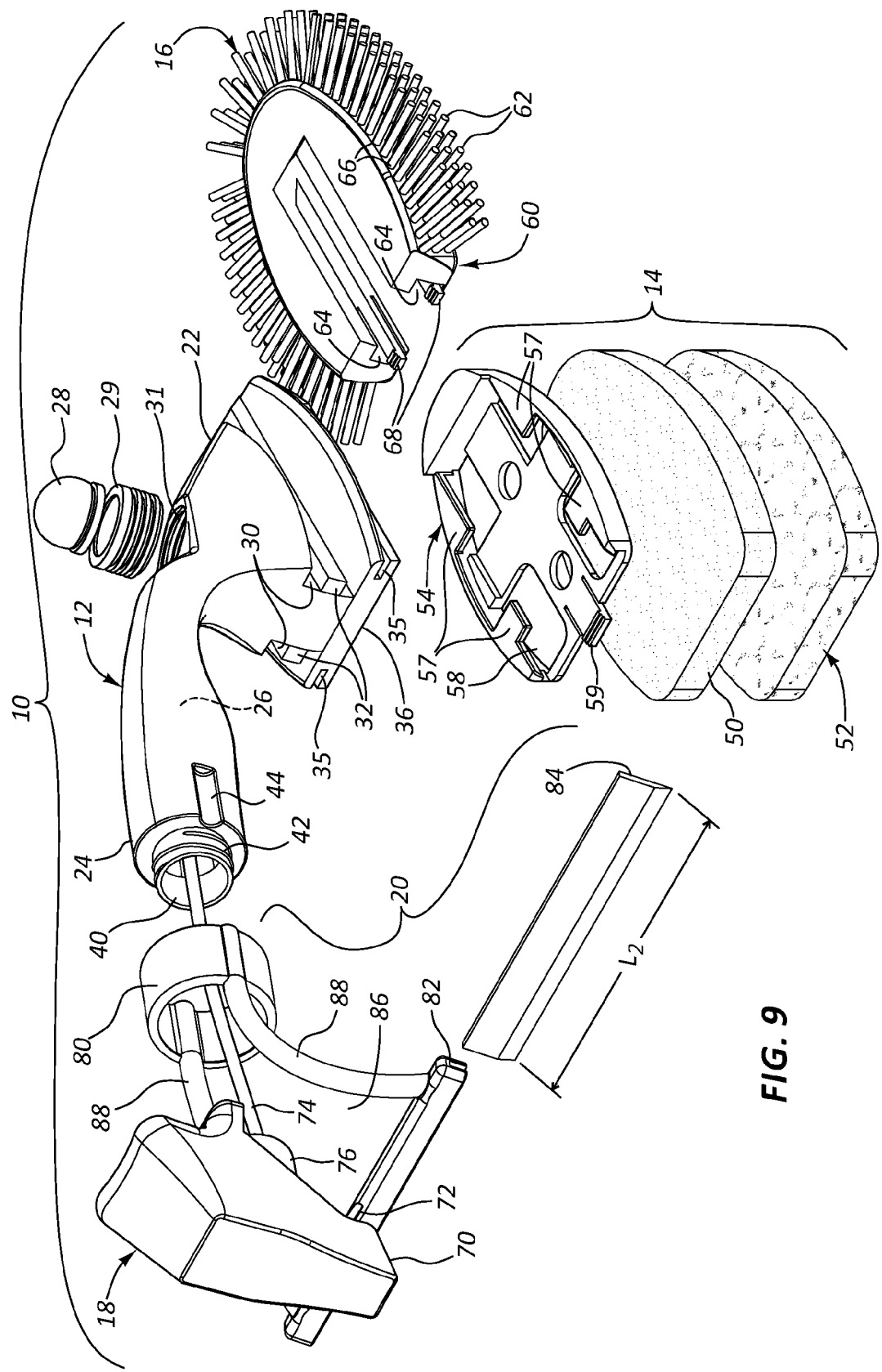
FIG. 9 is an exploded top perspective view of the cleaning device of FIG. 1.
Figure 10:
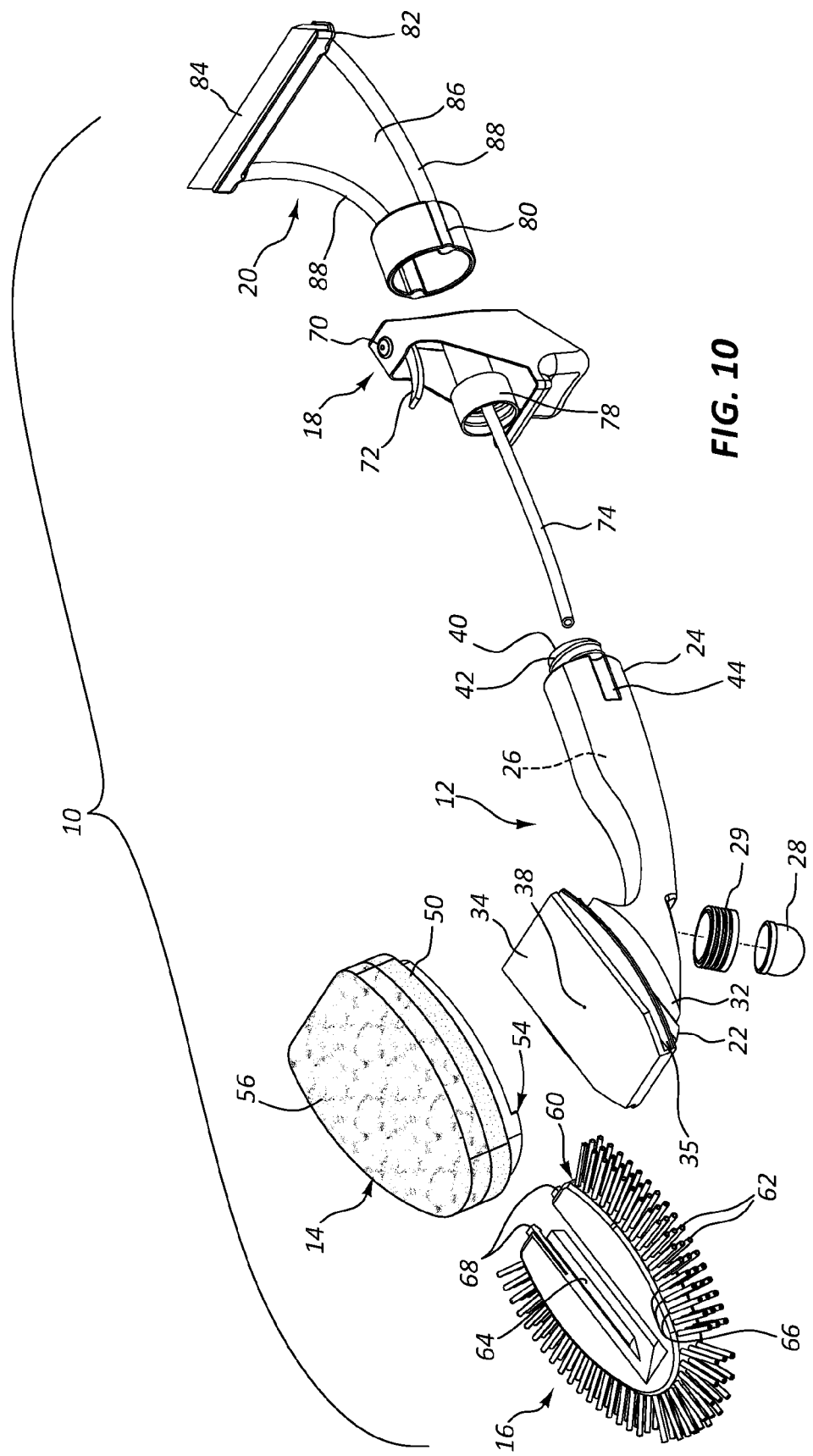
FIG. 10 is an exploded bottom perspective view of the cleaning device of FIG. 1.

Referring to FIGS. 9 and 10, the handle 12 includes first and second end portions 22, 24, a hollow interior 26, a pump member 28, a bristle mounting track 30, a bristle latch surface 32, a sponge mounting surface 34, a sponge track 35, and a sponge latch surface 36. The handle 12 may also include at least one fluid outlet 38 at the first end portion 22 (see FIGS. 10 and 11), a fluid inlet 40 at the second end portion 24, a dispenser mounting portion 42 at the second end portion 24, and a plurality of squeegee mounting features 44.

Figure 11:
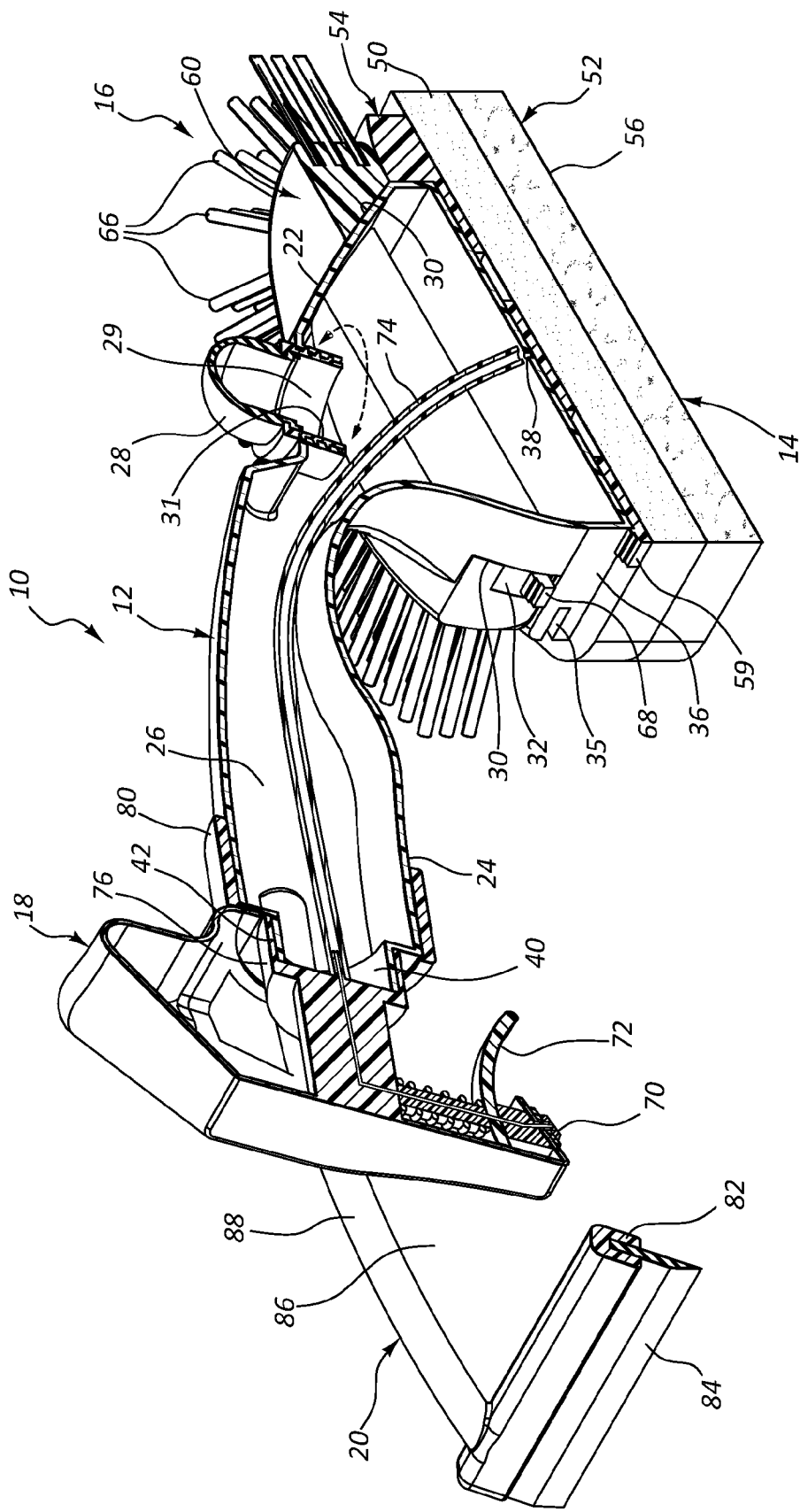
FIG. 11 is a cross-sectional view of the cleaning device of FIG. 5 taken along cross-section indicators 11-11.
Figure 12:
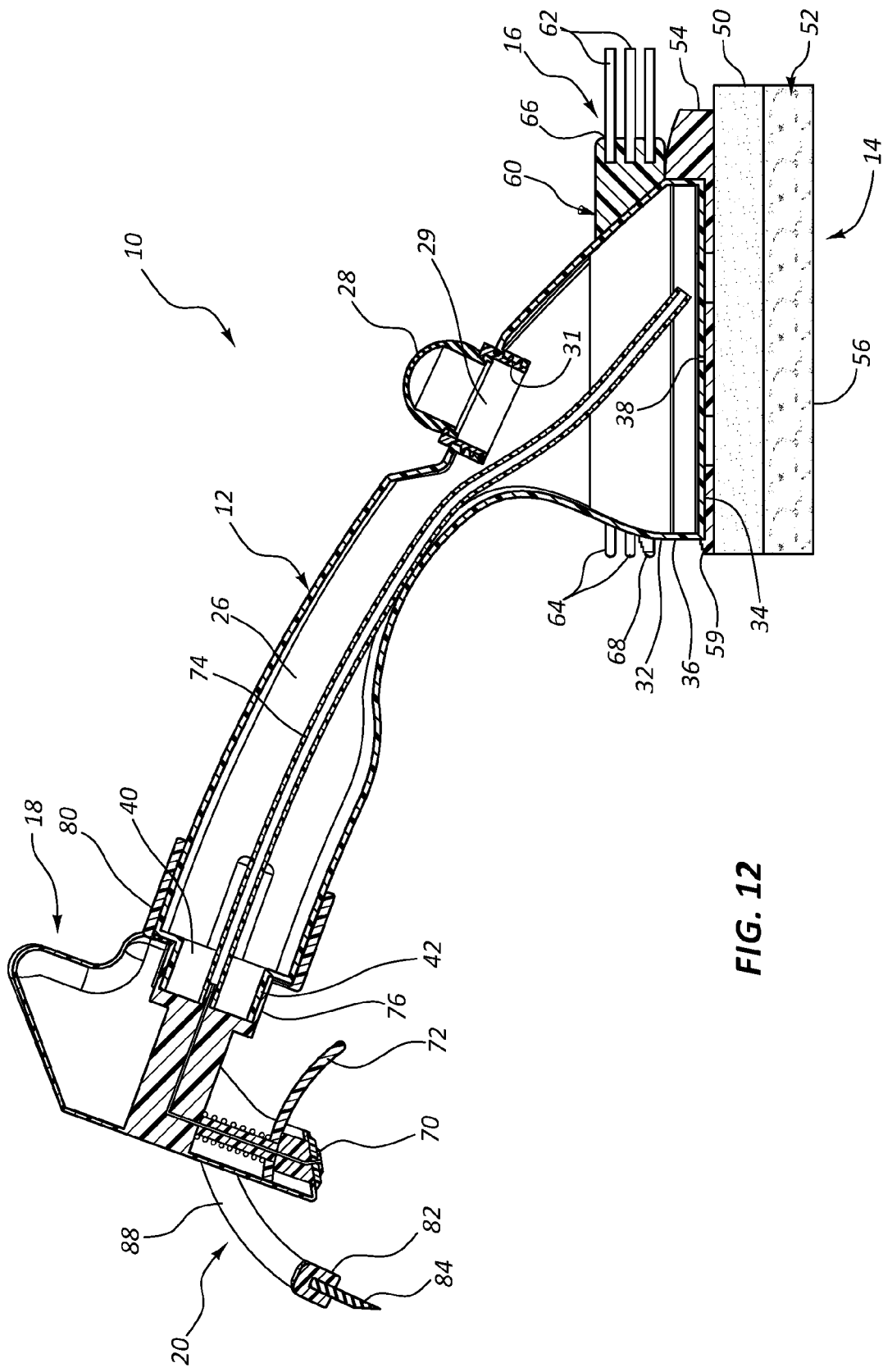
FIG. 12 is a cross-sectional side view of the cleaning device of FIG. 5 taken along cross-section indicators 12-12.

The handle 12 may further include a pump seat 29 to which the pump member 28 is mounted. Pump member 28 may be permanently connected to pump seat 29 (e.g., using an adhesive, a snap fit connection, or a fastener) to provide a pump cap assembly, which can be handled as a single unit. Alternatively, pump member 28 may be releasably mounted to pump seat 29 or other portion of handle 12. A pump opening 31 may be formed in the handle 12 and configured to mount the pump seat 29 (to which the pump member 28 is mounted) to the handle 12. Pump opening 31 may include attachment features for connecting pump seat 29 to handle 12 with a permanent or releasably connection. The pump seat 29 and pump opening 31 may include mating threads, which provide a releasably connection using a rotational movement of pump seat 29 relative to pump opening 31. FIGS. 11 and 12 show pump member 28 mounted to pump seat 29, and pump seat 29 threaded mounted within pump opening 31. Typically, pump member 28 is connected in some way to handle 12 with a fluid-tight connection. Additionally sealing features such as o-rings, washers, etc. may be used to provide fluid tight connections of any of the features of cleaning device 10 to handle 12 (e.g., sponge assembly 14, spray dispenser 18, pump member 28, and cap 19 (see FIGS. 21 and 22).

The spray dispenser 18 and pump member 28 may be referred to generally as dispensers or fluid dispensers. Accordingly, the cleaning device 10 may include at least one fluid dispenser, including at least one of the spray dispenser 18 and pump member 28. The cleaning device 10 may include a plurality of fluid dispensers, which may be positioned at various locations on cleaning device 10, may have different designs and operations, and may be operable concurrently or sequentially.

The hollow interior 26 of handle 12 may be filled with cleaning fluid through the pump opening 31 when the pump member 28 and/or pump seat 29 is removed from handle 12. Alternatively, the hollow interior 26 may be filled with cleaning fluid by removing spray dispenser 18 and filling through fluid inlet 40.

The hollow interior 26 is shown in further detail in the cross-sectional views of FIGS. 11 and 12. The hollow interior 26 may be filled with a cleaning fluid via at least one of the fluid inlet 40 and pump opening 31. The fluid outlet 38 is in flow communication with the hollow interior 26. Actuating the pump member 28 may increase pressure within the hollow interior 26 to force some of the cleaning fluid through the fluid outlet 38 and into the sponge assembly 14. The pump member 28 may be positioned at any location on the handle 12. The pump member 28 is shown positioned along a top surface of the handle 12 at a location for easy operation by, for example, a thumb or finger of an operator who is grasping the handle 12 while the operator holds the cleaning device 10 with the sponge assembly 14 facing away from the operator and in contact with a surface to be cleaned. The pump member 28 may be thumb or finger actuated. The pump member 28 may be removably mounted to the handle 12 to expose the pump opening 31 for purposes of, for example, filling the handle interior with a cleaning fluid. In one example, the pump member 28 is threadably mounted to the pump seat 29.

The pump member 28 may include a bulbous shaped member having a resilient, pliable construction. In one example, the pump member 28 comprises a rubber material or a polymer material such as silicone. The pump member 28 may be mounted to the handle 12 with a fluid-tight seal. In some arrangements, the cleaning device may include a plurality of pump members. In still other examples, the cleaning device may be operable without using a pump member. The size, shape and number of fluid outlets 38 may permit the cleaning fluid to flow out of the hollow interior 26 under natural forces (e.g., gravity forces and fluid pressures inherently present when the cleaning device 10 is a certain orientation).

The bristle mounting track 30 may be sized to receive a portion of the bristle assembly 16 as described below with reference to FIG. 14. The bristle latch surface 32 may provide a latch or stop surface against which a latch feature of the bristle assembly 16 contacts to hold the bristle assembly 16 fixed relative to the handle 12.

The sponge mounting surface 34 and sponge track 35 may be sized and shaped to receive a portion of the sponge assembly 14 as described below with reference to FIG. 13. The sponge latch surface 36 may be sized and arranged to receive or support a latch feature of the sponge assembly 14 to maintain a fixed position of the sponge assembly 14 relative to the handle 12. The bristle mounting track 30 and sponge track 35 may be positioned adjacent to each other at the first end portion 22 of the handle 12. As discussed above, the sponge assembly 14 and bristle assembly 16 may be integrally formed as a single piece or assembly, which may be mounted to the handle 12 in a single assembly step. In such an integrated configuration, at least one of the bristle mounting track 30 and sponge track 35 may be included on the handle 12 for mounting the scrubber features of the cleaning device.

The cleaning device 10 may include any desired number of fluid outlets 38. The shape, size, orientation and number of fluid outlets 38 may be optimized for a given type of cleaning fluid and a desired rate of fluid flow to the sponge assembly 14 and other scrubbing features of the cleaning device. For example, the viscosity of the cleaning fluid may dictate the number and size of the fluid outlets 38. The fluid outlets 38 may be formed adjacent to the sponge mounting surface 34 and may be positioned directly adjacent to features of the sponge assembly 14 (e.g., a surface of a sponge portion).

The fluid inlet 40 may be positioned at the second end portion 24. The fluid inlet 40 may be positioned adjacent to the dispenser mounting portion 42. The fluid inlet 40 may be closed or covered upon attachment of the spray dispenser 18. In other arrangements, the fluid inlet 40 may be covered by securing a cap or other fluid dispensing feature to the dispenser mounting portion 42 in place of the spray dispenser 18. The dispenser mounting portion 42 may include a connecting feature such as, for example, a plurality of threads. The connecting feature may provide a releasable attachment of the spray dispenser 18, cap, or other sealing device to close the fluid inlet 40.

The squeegee mounting features 44 may be positioned adjacent to the dispenser mounting portion 42. The squeegee mounting features 44 may include a plurality of recesses, protrusions or other connection features that help maintain axial and rotational positions of the squeegee 20 relative to the handle 12. In one example, the squeegee mounting features 44 a pair of recesses positioned on opposing sides of the dispenser mounting portion 42. The squeegee mounting features 44 may provide axial and rotational position stops for the squeegee 20 when the squeegee 20 is mounted to the handle 12. The squeegee 20 is typically first mounted to the handle 12, followed by mounting the spray dispenser 18 to the dispenser mounting portion 42. The spray dispenser 18 may contact a portion of the squeegee 20 to lock the squeegee 20 within the squeegee mounting features 44 (see FIG. 12). Removing the spray dispenser 18 from the handle 12 permits the squeegee 20 to be removed from the handle 12.

Other types of connecting features may be used in place of the squeegee mounting features 44, including, for example, brackets, divots, grooves and other features that are integrally formed with the handle 12 or separately formed and independently mounted to the handle 12. The squeegee 20 may include connecting features of its own that promote releasable or permanent connection of the squeegee 20 to the handle 12.

Figure 17:
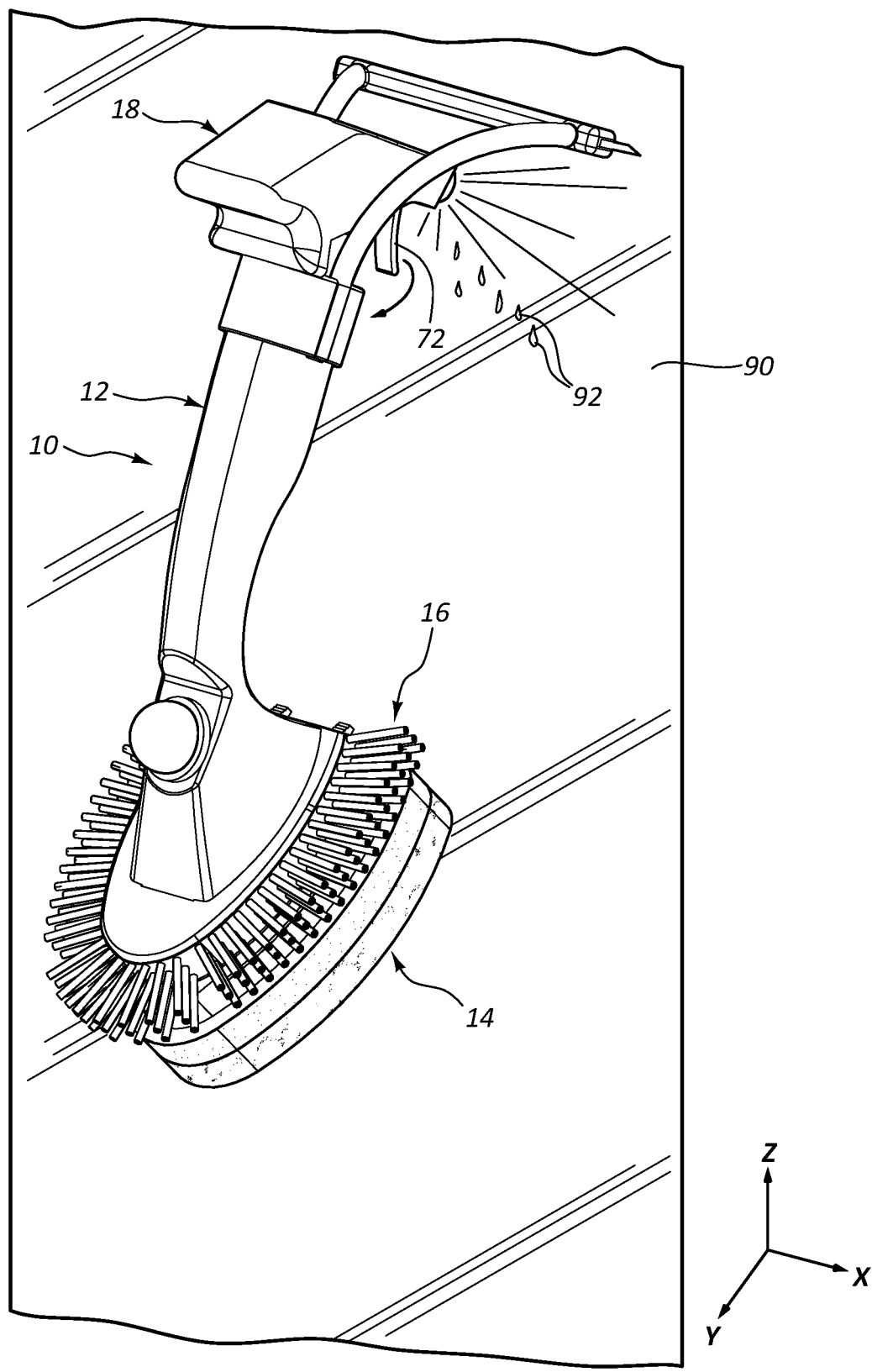
FIG. 17 shows the cleaning device of FIG. 1 in use spraying a cleaning fluid onto a surface to be cleaned in accordance with the present disclosure.
Figure 19:
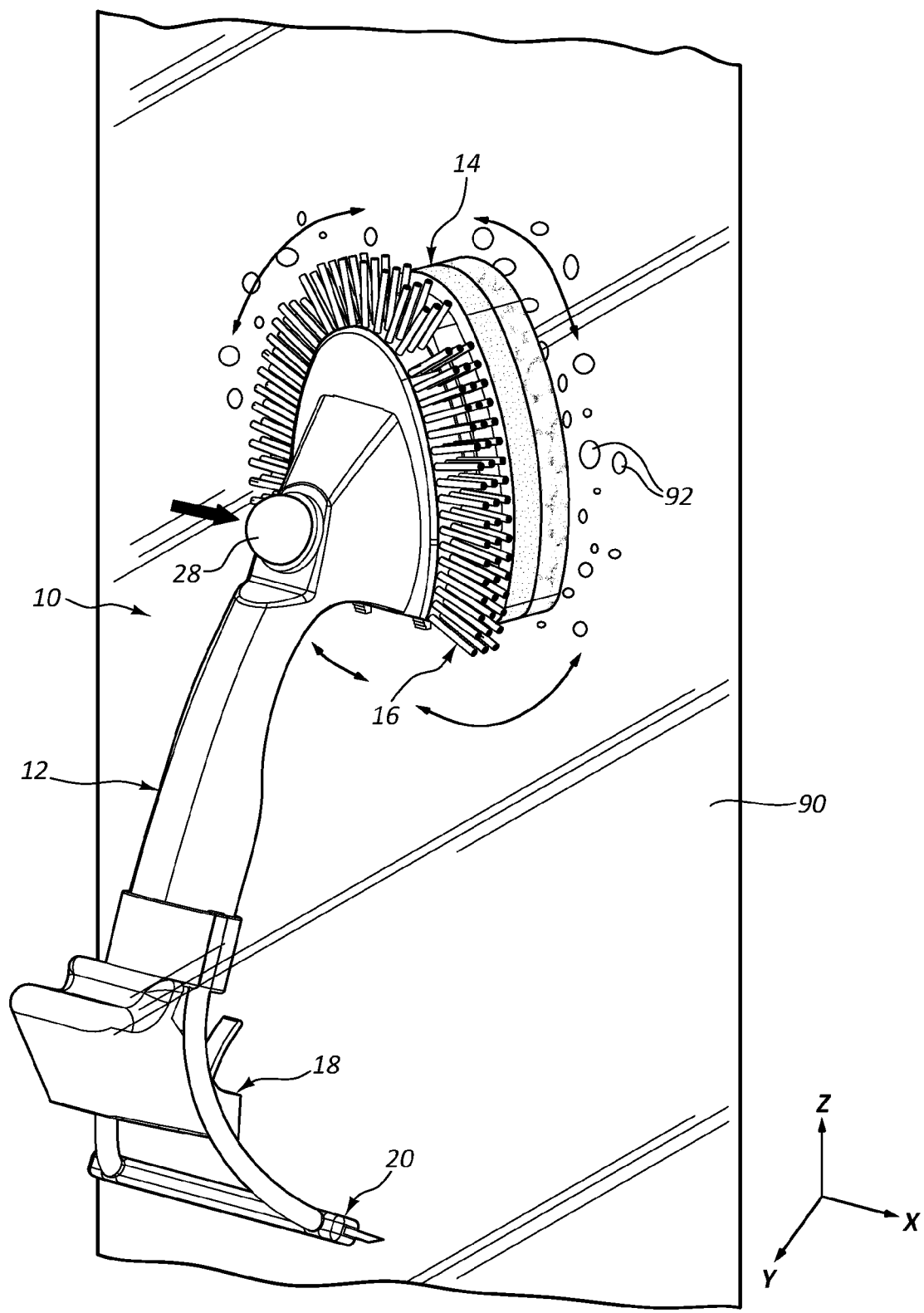
FIG. 19 shows the cleaning device of FIG. 1 in operation scrubbing a surface to be cleaned and depositing a cleaning fluid using a sponge assembly in accordance with the present disclosure.
Figure 20:
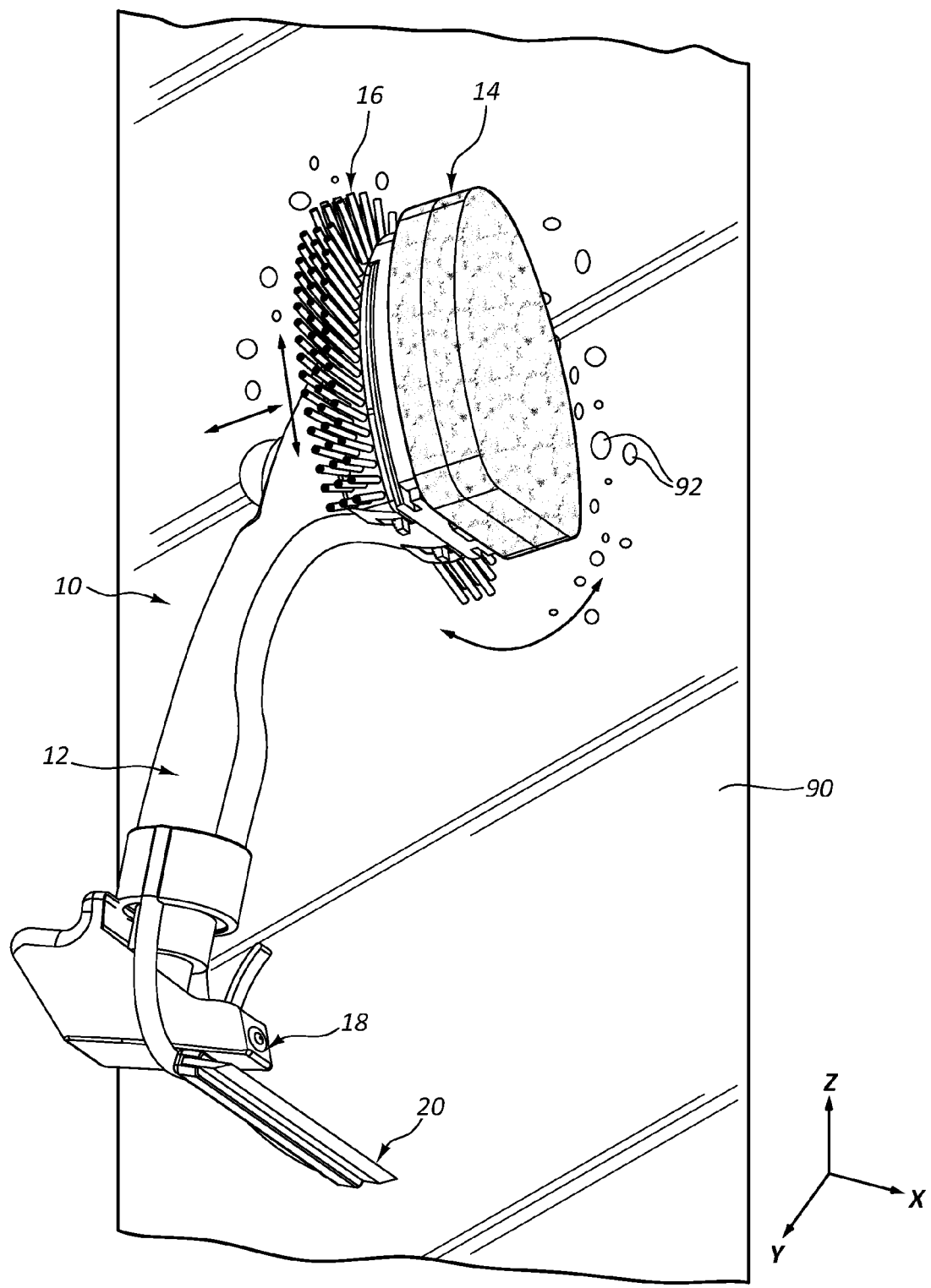
FIG. 20 shows the cleaning device of FIG. 1 in operation scrubbing a surface to be cleaned with a bristle assembly in accordance with the present disclosure.

The handle 12 may have a generally elongate shape with a grasping portion between the first and second end portions 22, 24. The handle 12 may have a generally contoured construction that provides improved ergonomics for grasping by a user whether the cleaning device 10 is arranged upright as shown in FIG. 19, upside down as shown in FIG. 17, or rotated about a longitudinal axis of the handle 12 as shown in FIG. 20.

The handle 12 may comprise transparent or translucent materials. Forming the handle with transparent or translucent materials may provide the user with a visual assessment of the amount of cleaning fluid held in the hollow interior 26. The handle 12 may comprise any desired materials such as, for example, various polymer materials or other non-corrosive materials such as, for example, composite materials and metal alloys.

Figure 4:
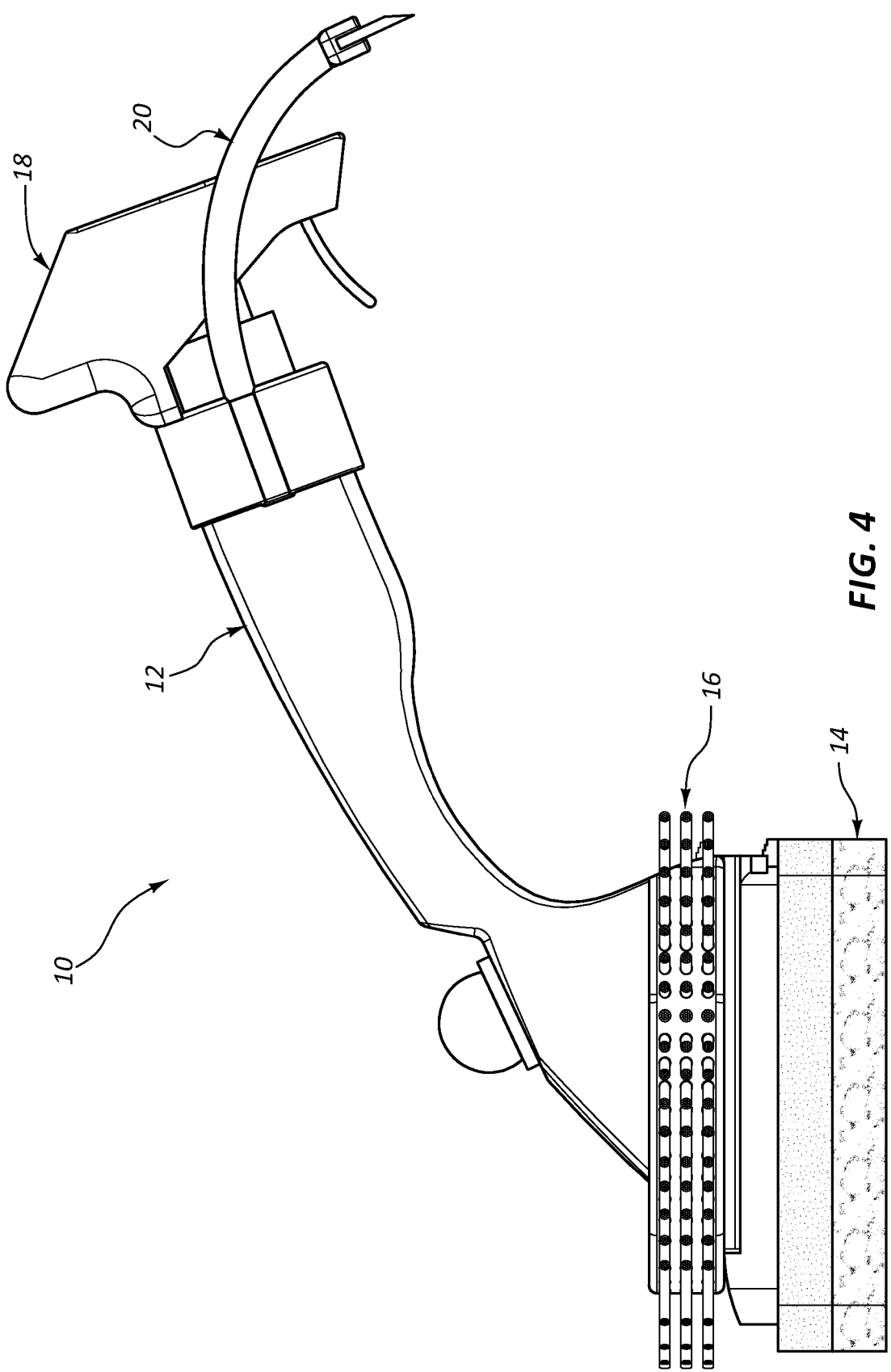
FIG. 4 is a right side view of the cleaning device of FIG. 1.
Figure 5:
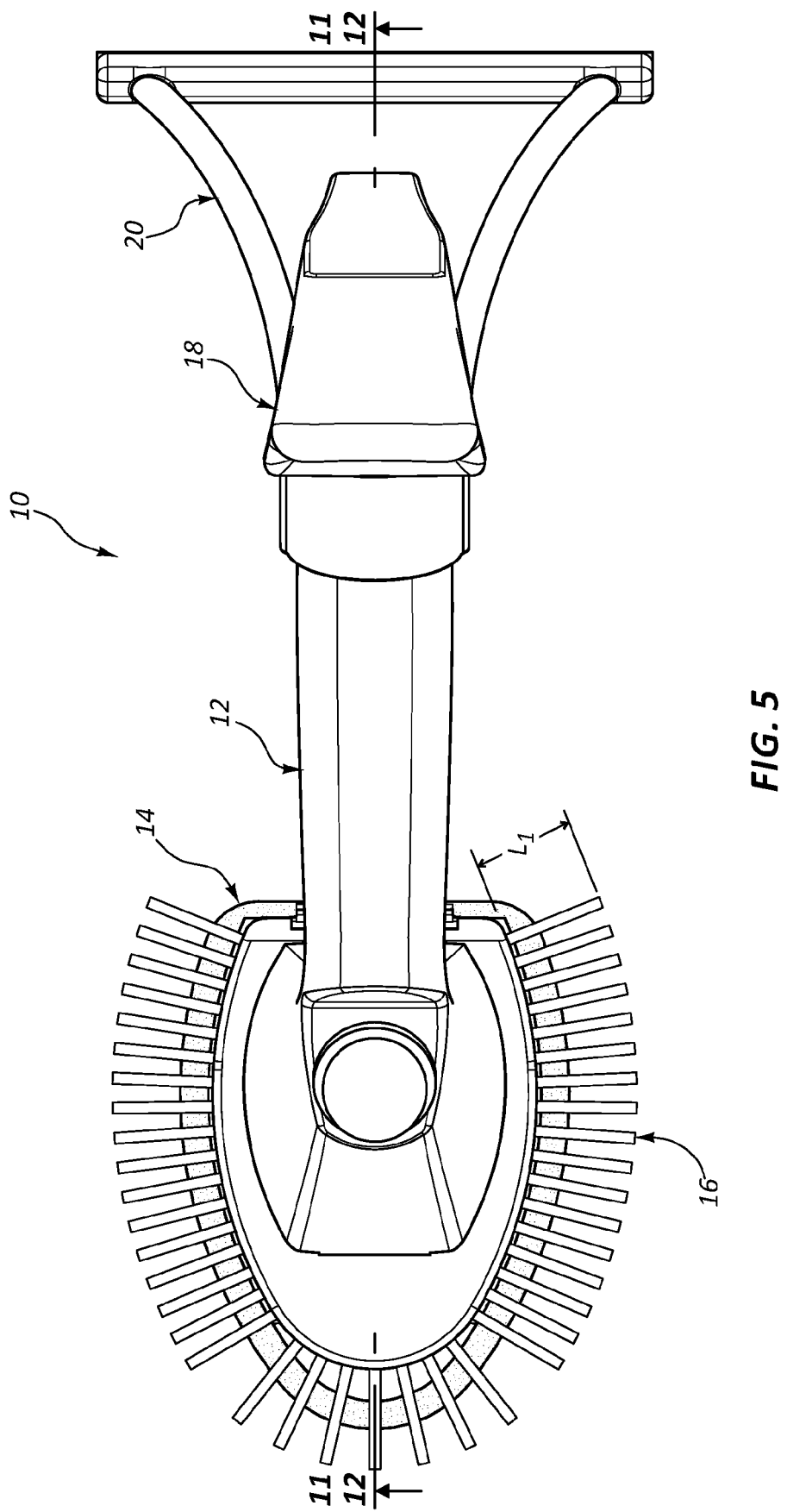
FIG. 5 is a top view of the cleaning device of FIG. 1.
Figure 6:
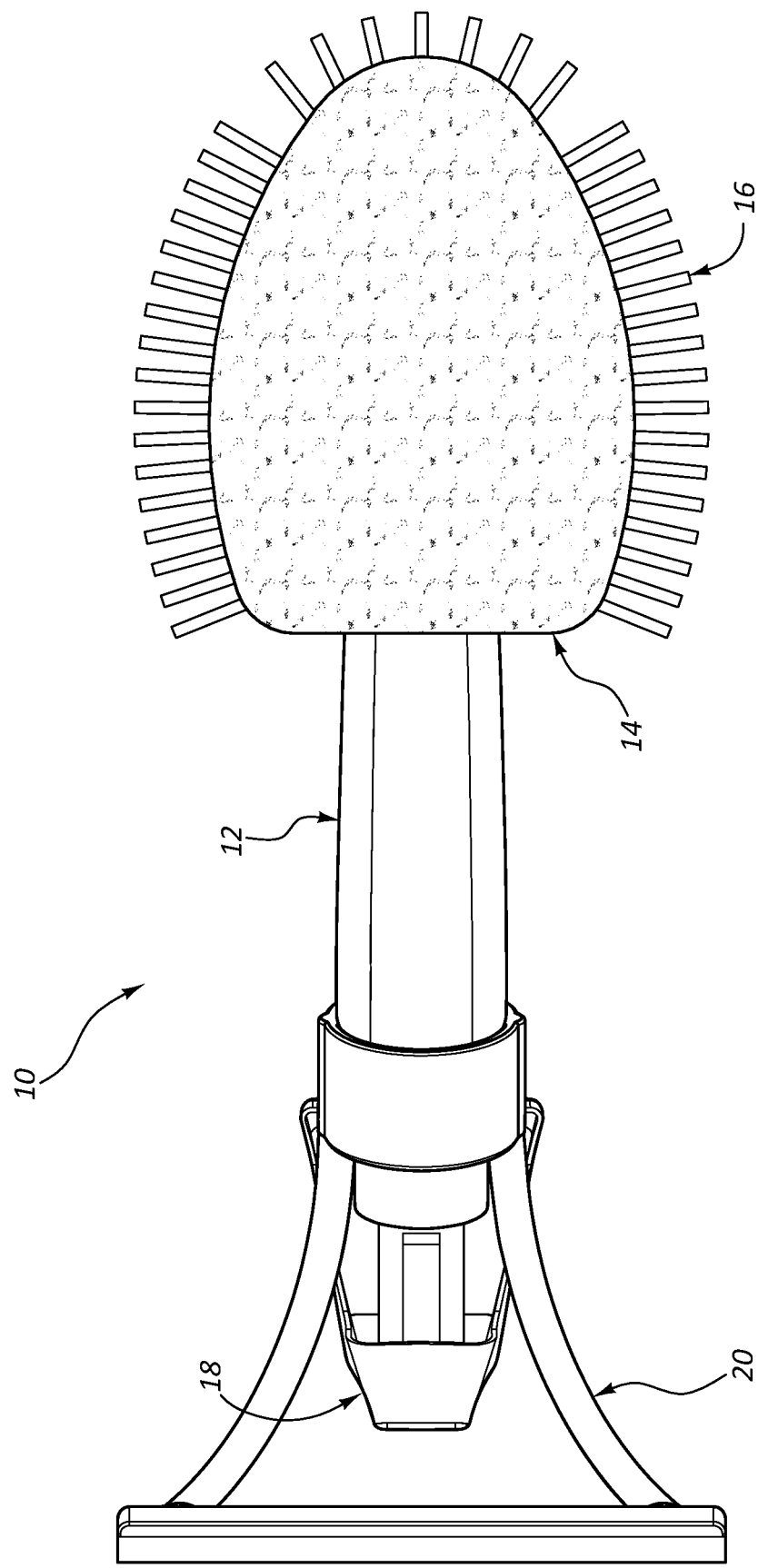
FIG. 6 is a bottom view of the cleaning device of FIG. 1.
Figure 7:
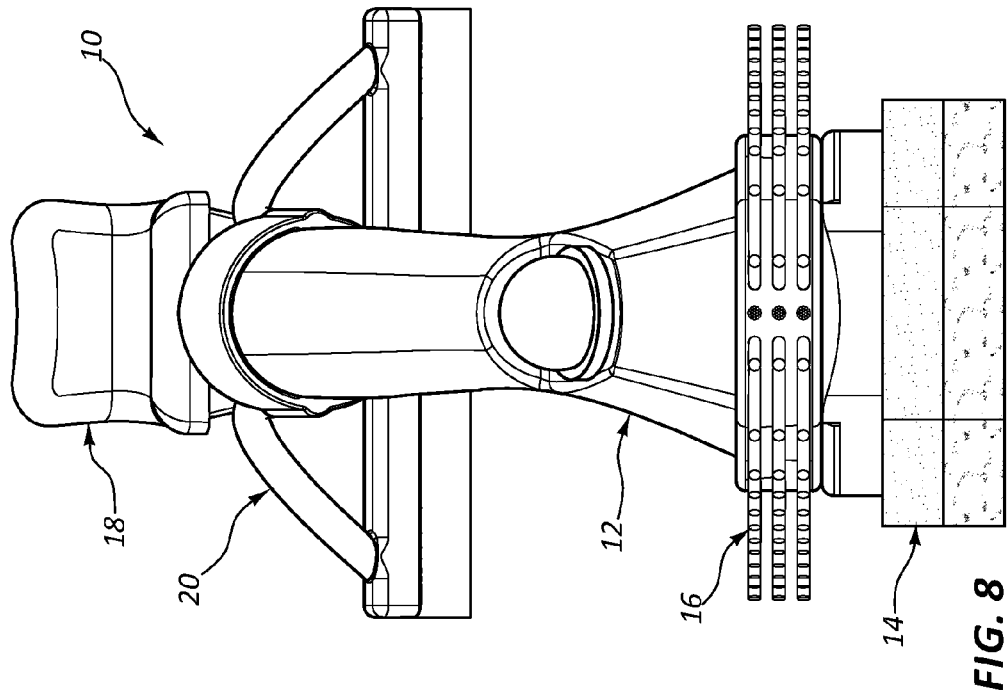
FIG. 7 is a rear view of the cleaning device of FIG. 1.
Figure 8:
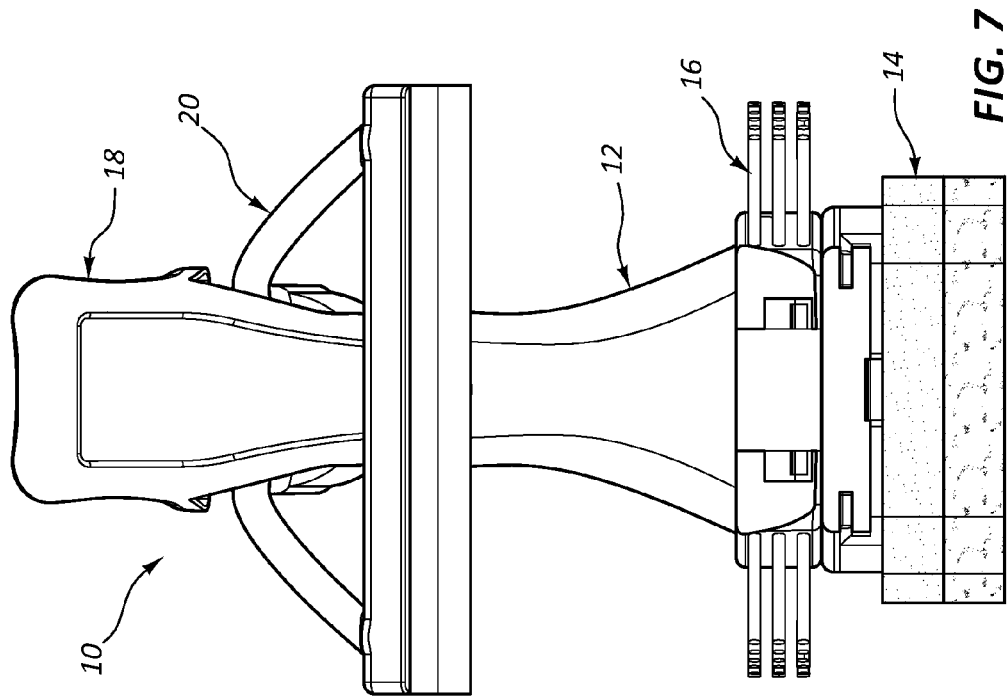
FIG. 8 is a front view of the cleaning device of FIG. 1.

The handle 12 may extend at an angle relative to a bottom surface e.g., abrasive surface 56 shown in FIG. 10) of the sponge assembly 14 (see FIG. 4). An angle α may be measured between a longitudinal axis D and the abrasive surface 56. The angle α may great enough to space apart the squeegee 20 from a surface to be cleaned by the abrasive surface 56 of the sponge assembly 14 when abrasive surface 56 is in contact with the surface being cleaning. The angle α may be in the range of about 10° to about 60°, and more particularly in the range of about 20° to about 40°. The angle α selected may be influenced by, for example, the design of squeegee 20 (e.g., orientation of a blade 84 of the squeegee 20) and the design and orientation of sponge assembly 14. For example, the range of angles α that are possible may vary depending on the size, shape and orientation of squeegee 20 (e.g., angle θ as described below). In some embodiments, angle α is selected to provide a significant spacing between the surface to be cleaned and a blade of squeegee 20 during typical use of sponge assembly 14 and bristle assembly 16 to clean a given surface (e.g., various angled positions of abrasive surface 56 relative to the surface being cleaned).

The sponge assembly 14 may include a sponge portion 50, an abrasive pad 52, and a sponge base 54. The sponge base 54 may be mounted to a first primary surface of the sponge portion 50. The abrasive pad 52 may be mounted to an opposite primary surface of the sponge portion 50. The abrasive pad 52 may define an abrasive surface 56 (see FIG. 10). The abrasive pad 52 may include other abrasive surfaces such as, for example, the peripheral, radially outward facing surface of abrasive pad 52. The sponge base 54 may include a receiving track 58 and a sponge latch 59. The sponge base 54 may comprise a rigid material, or at least a material that can have attachment features formed therein for connecting the sponge assembly 14 to handle 12.

The receiving track 58 may include a plurality of tabs 57 for securing the sponge assembly 14 to the handle 12. The receiving track 58 may be sized to receive the sponge track 35 of the handle 12 and be in contact with the sponge mounting surface 34 as described below with reference to FIG. 13. The sponge latch 59 may interface with the sponge latch surface 36 of the handle 12 to secure the sponge assembly 14 in a fixed position relative to the handle 12 after assembly. The sponge latch 59 may be operable to move into a release position, thereby permitting detachment of the sponge assembly 14 from the handle 12 by removing the sponge mounting surface 34 from the sponge receiving track 58.

The sponge portion 50 may have a different material composition from the abrasive pad 52. In one example, the sponge portion 50 comprises a sponge material such as, for example, natural sea sponges or synthetic sponges comprising, for example, cellulose wood fiber. The abrasive pad 52 may comprise materials such as, for example, steel wool, course nylon fibers or other polymeric materials, or other scouring materials. The sponge base 54 may comprise a relatively rigid material such as, for example, a molded, rigid plastic. The sponge base 54 may be secured to the sponge portion 50 using, for example, an adhesive or other bonding agent. In one example, the sponge portion 50 is formed directly onto the sponge base 54 during formation of the sponge portion 50. The abrasive pad 52 may be formed directly on to the sponge portion 50, or the sponge portion 50 may be formed directly on to the abrasive pad 52. Alternatively, the sponge portion 50 may be attached to the abrasive pad 52 using, for example, fasteners, a forming technique, heat bonding, or a bonding agent such as, for example, an adhesive.

The sponge assembly 14 may alternatively include one or the other of the sponge portion 50 and abrasive pad 52. For example, the sponge base 54 may be directly mounted to the abrasive pad 52 without an intervening sponge portion 50. The sponge portion 50 may comprise materials providing sufficient scrubbing or abrasion properties such that a separate abrasive pad 52 is not required for a given intended scrubbing function.

The shape and size of the sponge portion 50 and abrasive pad 52 may vary depending on a number of considerations. For example, the sponge portion 50 and abrasive pad 52 may have a generally contoured peripheral shape. Such a contoured shape may provide improved scrubbing in corners. Other shapes are possible including, for example, generally rectangular outer peripheral shapes. Furthermore, the abrasive surface 56 of the abrasive pad 52 may have a generally planar shape. Other arrangements may include a contoured shape along the abrasive surface 56. The abrasive surface 56 may include a plurality of grooves, ridges, or other features that may provide enhanced scrubbing.

The bristle assembly 16 may include a bristle base 60 and a plurality of bristles 62. The bristle base 60 may include a track portion 64 sized for insertion into the bristle mounting track 30 of the handle 12. The bristle base 60 may include at least one bristle latch 68 that interfaces with the bristle latch surface 32 of the handle 12 to provide a fixed (e.g., and/or releasable) connection of the bristle assembly 16 to the handle 12. The bristle latch 68 may be operable into a release position detached from the bristle latch surface 32 to permit removal of the bristle assembly 16 from the handle 12, as described below with reference to FIG. 14.

The bristle base 60 may also include a plurality of bristle mounting aperture 66 sized to receive the bristles 62. The bristle mounting aperture 66 may be preformed in the bristle base 60 and the bristles 62 are later inserted into the bristle mounting apertures 66. Alternatively, the bristle base 60 is formed around portions of the bristles 62 during manufacturing (e.g., during a co-molding process).

The bristles 62 are arranged extending radially outward along a peripheral surface of the bristle base 60. The bristles 62 extend coplanar with each other. The bristles 62 extend in a plane that is parallel with the abrasive surface 56 of the abrasive pad 52. The bristles 62 may be arranged in a plurality of rows. The bristles 62 may have any desired length, cross-sectional shape, cross-sectional size, length, stiffness and other properties. In one example, the bristles 62 have a length $L_1$ (see FIG. 5) of about 0.25 inches to about 3 inches, and more particularly about 0.5 inches to about 1.5 inches.

In other examples, the bristles 62 may extend in other planes and may be mounted to other surfaces, such as various surfaces of the bristle base 60, sponge assembly 14, or handle 12. The bristles 62 may also have different lengths at different positions along the bristle base 60. The bristles 62 shown in the figures may have a plurality of lengths on a given bristle assembly 16. The length $L_1$ of the bristles 62 may change going around the bristle base 60.

The sponge assembly 14 and bristle assembly 16 may alternatively be formed as a single assembly. For example, the features of bristle base 60 may be integrally formed with the sponge base 54. The bristles 62 may be directly mounted to the integrally formed base portion. Providing the sponge assembly 14 and bristle assembly 16 integrally formed as a single assembly may reduce the number of parts, but may increase complexity of manufacturing. Providing the sponge assembly 14 and bristle assembly 16 as separate assemblies that are separately mountable to the handle 12 may provide certain advantages. For example, providing two separate assemblies provides two separate replaceable parts that may be worn out at different rates depending on the cleaning functions performed using the cleaning device 10. The user may then be able to replace the sponge assembly 14 and bristle assembly 16 at different times depending on the different wear rates.

Further, the sponge assembly 14 and bristle assembly 16 may be independently usable when separated from the handle 12 to perform certain cleaning functions. Either one of the sponge assembly 14 and bristle assembly 16 may be removed from the handle 12 as desired so that the cleaning device 10 has fewer cleaning function capabilities, but may be able to perform those limited functions without potential interference from other features of the cleaning device 10.

When the sponge assembly 14 is removed from the handle 12, a separate cap or cover feature may be secured in place of the sponge assembly 14 to cover the fluid outlets 38. In one example, a plug member is used to fit directly into the fluid outlets 38 when the sponge assembly 14 is removed.

The spray dispenser 18 includes a spray nozzle 70, a handle 72, a dipstick 74, and an attachment portion 76. The handle 72 may be operable to create a flow of the cleaning fluid from the hollow interior 26, through the dipstick 74, and out through the spray nozzle 70. The spray nozzle 70 may be operable to adjust how the cleaning fluid is dispensed (e.g., as a stream or as a spray plume). The dipstick 74 may extend into the hollow interior 26. The dipstick 74 may extend to an end of handle 12 opposite the dispenser mounting portion 42. The spray dispenser 18 may be most effectively operated when the cleaning device 10 is oriented in an upright or nearly upright position (e.g., see orientation of FIG. 17).

The attachment portion 76 may attach directly to the dispenser mounting portion 42 of the handle 12. The attachment portion 76 may include an attachment feature such as, for example, a plurality of threads. Other attachment features may be used to secure the spray dispenser 18 to the handle 12. The spray dispenser 18 may be rotated relative to handle 12 to direct the spray nozzle 70 in various directions relative to the other features of cleaning device 10. When the squeegee 20 is mounted to the handle 12, the spray dispenser 18 may be limited in its ability to rotate relative to the handle 12 due to interference with features of the squeegee 20. The attachment portion 76 may contact a portion of squeegee 20 to help lock the squeegee in a given mounted position on the handle 12 (see FIG. 12).

Other types of fluid dispensers may be used in place of the spray dispenser 18. Other dispensing features may include, for example, a push-pull valve member through which a stream of fluid is dispensed, a removable cap, or a plurality of holes.

The squeegee 20 includes a base 80, a blade support 82, a blade 84, a dispenser aperture 86, and support arms 88. The base 80 is sized and configured to mount the squeegee 20 to the handle 12. The base 80 may include an aperture or bore through which a portion of the handle 12 extends. The base 80 may be mounted to the handle 12 prior to mounting the spray dispenser 18 to the handle as described below with reference to FIGS. 15 and 16. The base 80 may be maintained in a given axially position along the length of the handle 12 using an attachment feature such as, for example, the squeegee mounting features 44 described above, a twist activated interference fit, or a threaded connection. In some examples, squeegee 20 is permanently mounted to handle 12. The base 80 may include at least one recess, protrusion or other feature that mates with the squeegee mounting features 44 to assisting in fixing (temporarily or permanently) an axial and/or rotational position of the squeegee 20 relative to the handle 12. Other attachment features may include, for example, a bonding agent such as an adhesive, a heat weld (e.g., via laser or sonic welding), a bracket or fasteners.

The blade 84 may have any desired shape and size. For example, the blade 84 may have a generally linear shape as shown in the figures. Alternatively, the blade 84 may have a contoured shape. The blade 84 may have any desired length and width. In one example, a length $L_2$ of the blade 84 (see FIG. 9) is in the range of about 3 inches to about 10 inches, and more particularly in a range of about 4 inches to about 6 inches.

Figure 18:
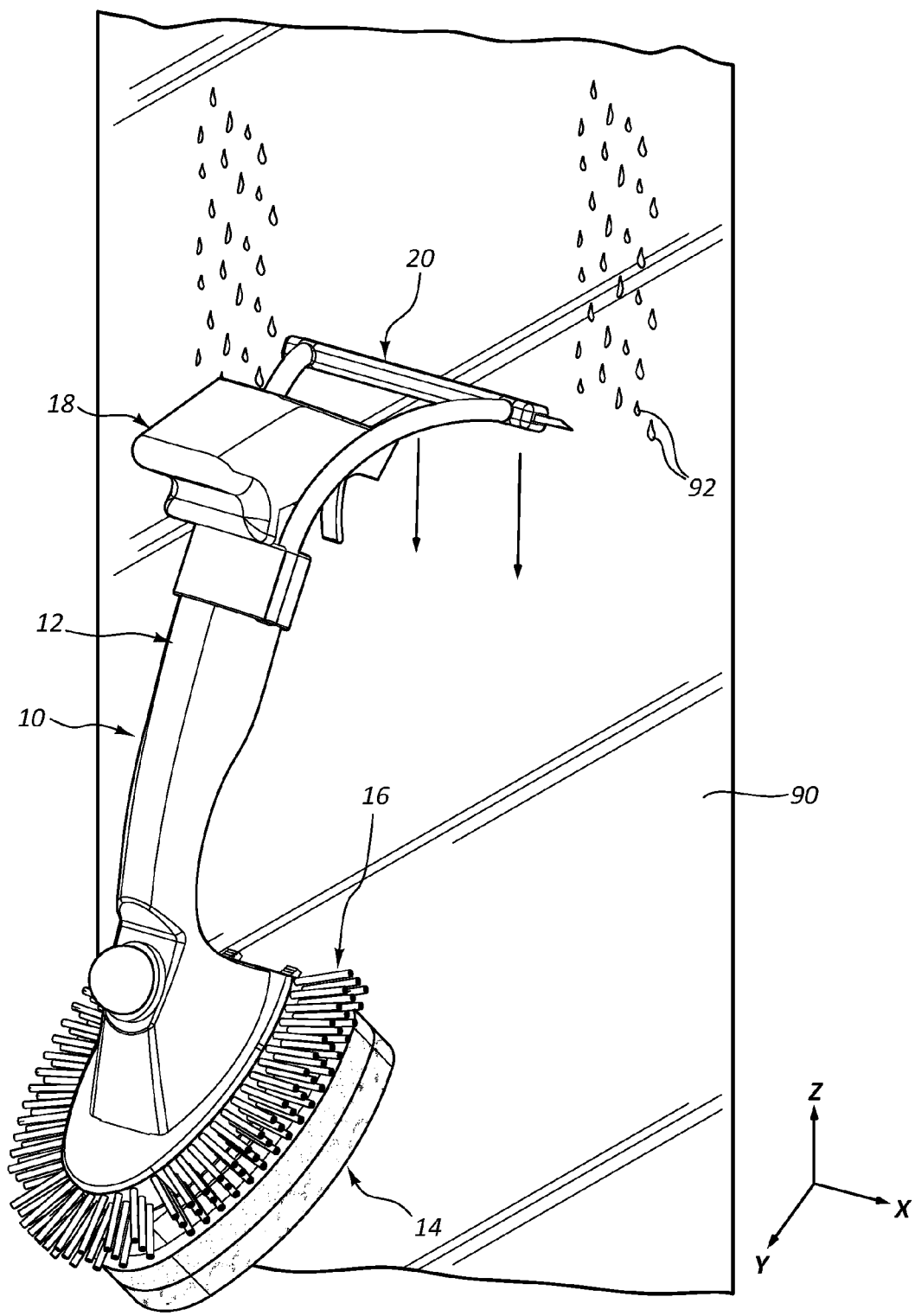
FIG. 18 shows the cleaning device of FIG. 1 in operation removing fluid from a surface to be cleaned in accordance with the present disclosure.

The squeegee 20 may have a contoured shape along its length to position the blade 84 extending at an angle θ relative to a longitudinal axis D of the handle 12 see FIG. 4. The angle θ is typically in the range of about 0° to about 120°, more particularly in the range of about 45° to about 90°. Providing the blade 84 at an angle relative to the axis D of the handle 12 may make it possible to hold the cleaning device 10 in an upside down, generally vertical position while removing fluid from a surface to be cleaned as shown in FIG. 18. The arrangement of blade 84 may provide positioning of the sponge assembly 14 away from the surface to be cleaned without the sponge assembly 14 having to be held at a significant distance from the surface to be cleaned. The support arms 88 may have a shape and size (e.g., length) that provides the angled orientation of blade 84 relative to longitudinal axis D and a relative position between blade 84 and sponge assembly 14.

The blade support 82 may be used to hang the cleaning device 10 on, for example, a support structure such as a hook, shelf, pipe, handle, or other projection in a bathtub space or shower stall. The dispenser aperture 86 may be defined between blade support 82 and support arms 88. A size and shape of dispenser aperture 86 depends at least in part on the size and shape of blade support 82 and support arms 88. Dispenser aperture 86 may be sized to receive any number of different sized and shaped support structures upon which cleaning device 10 may be supported for the purposes of hanging cleaning device 10.

Being able to hang cleaning device 10 via squeegee 20 in or adjacent to a shower/tub space in a bathroom may greatly influence the frequency that cleaning device 10 is used to clean the shower/tub space or other features of a bathroom. Furthermore, hanging cleaning device 10 may make it easier to store cleaning device in an out-of-the-way location that is typically not used for storing bathroom cleaning supplies. Being able to hang cleaning device via squeegee 20 may also provide a convenient way to dry off cleaning device 10 between uses, wherein any extra fluids that may be on cleaning device 10 are able to drip into the shower/tub without making a mess that requires separate cleaning up.

The dispenser aperture 86 may be sized for at least a portion of the spray dispenser 18 to be positioned therein. The dispenser aperture 86 may have a generally triangular shape. The operator's hand may wrap around a portion of the squeegee 20 when operating the handle 72 of the spray dispenser 18. The squeegee 20 may have a generally contoured shape along its length between the base 80 and the blade 84 for improved ergonomics for the user's hand when operating the handle 72. The squeegee 20 may have a length sufficient to position the blade 84 spaced away from the spray dispenser 18. FIG. 4 shows a spacing S between the blade support 82 and the spray dispenser 18. The spacing S may be in the range of, for example, about 0.5 inches to about 4 inches, and more particularly in the range of about 0.75 inches to about 2 inches.

The materials of the spray dispenser 18 and squeegee 20 may comprise, for example, a polymer-based material having properties of, for example, durability, low weight, and easy moldability. In one example, the blade 84 comprises a pliable, resilient material such as rubber. The blade 84 may be connected to the blade support 82 using, for example, an adhesive or other bonding agent.

Figure 13:
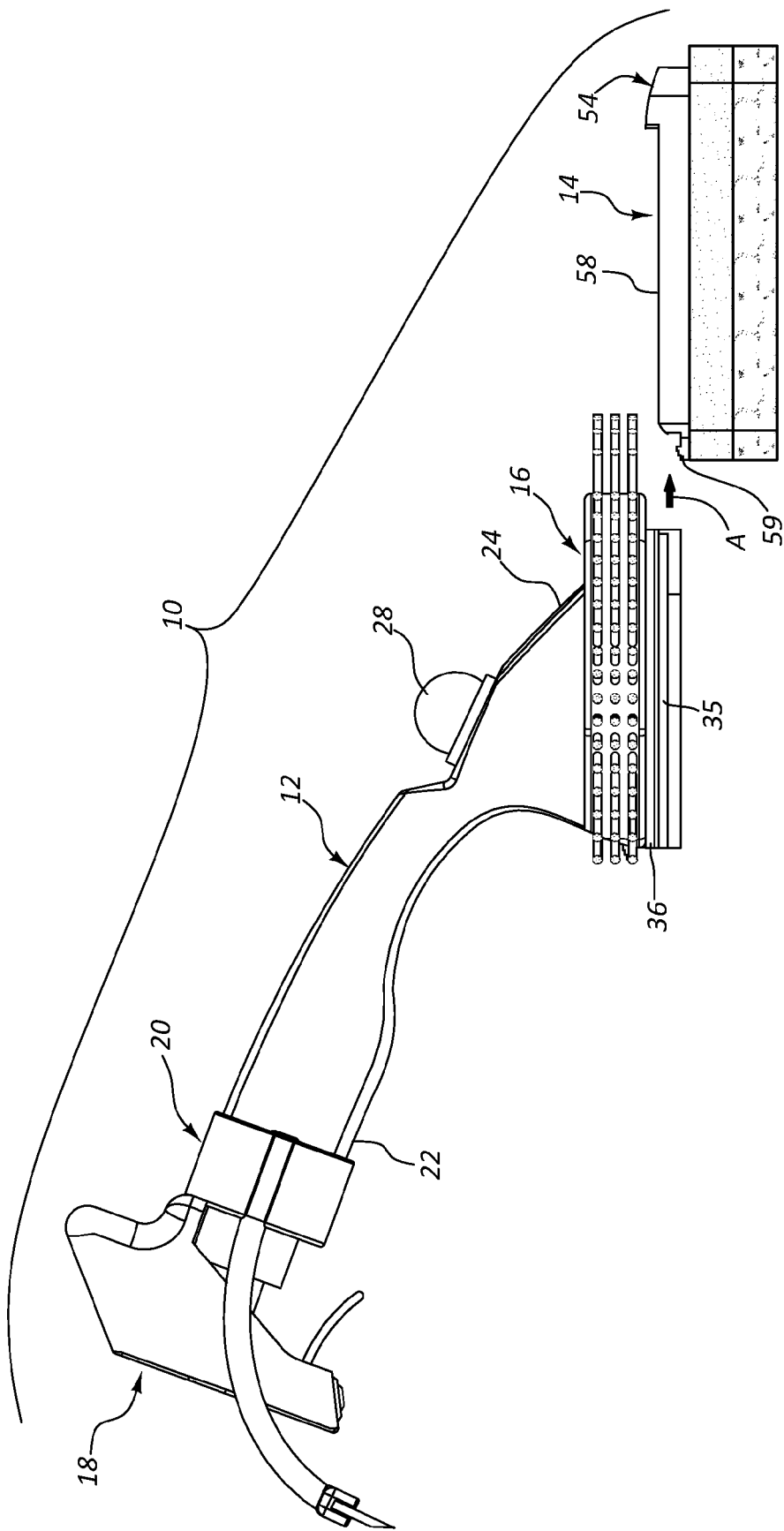
FIG. 13 is a partially exploded side view of the cleaning device of FIG. 1.

Referring now to FIG. 13, an assembly step for assembling portions of the cleaning device 10 is shown. The sponge assembly 14 is shown detached from the handle 12 while the remaining features of the cleaning device 10 are assembled together. The sponge assembly 14 is positioned in front of the first end portion 22 of the handle 12. The handle 12 is advanced in a direction A toward the sponge assembly 14 to insert the sponge mounting surface 34 into the sponge receiving track 58 until the sponge receiving track 58 latches onto the sponge latch surface 36. In other arrangements, the sponge assembly 14 is advanced onto the handle 12 in an opposite direction of the arrow A shown in FIG. 13.

Figure 14:
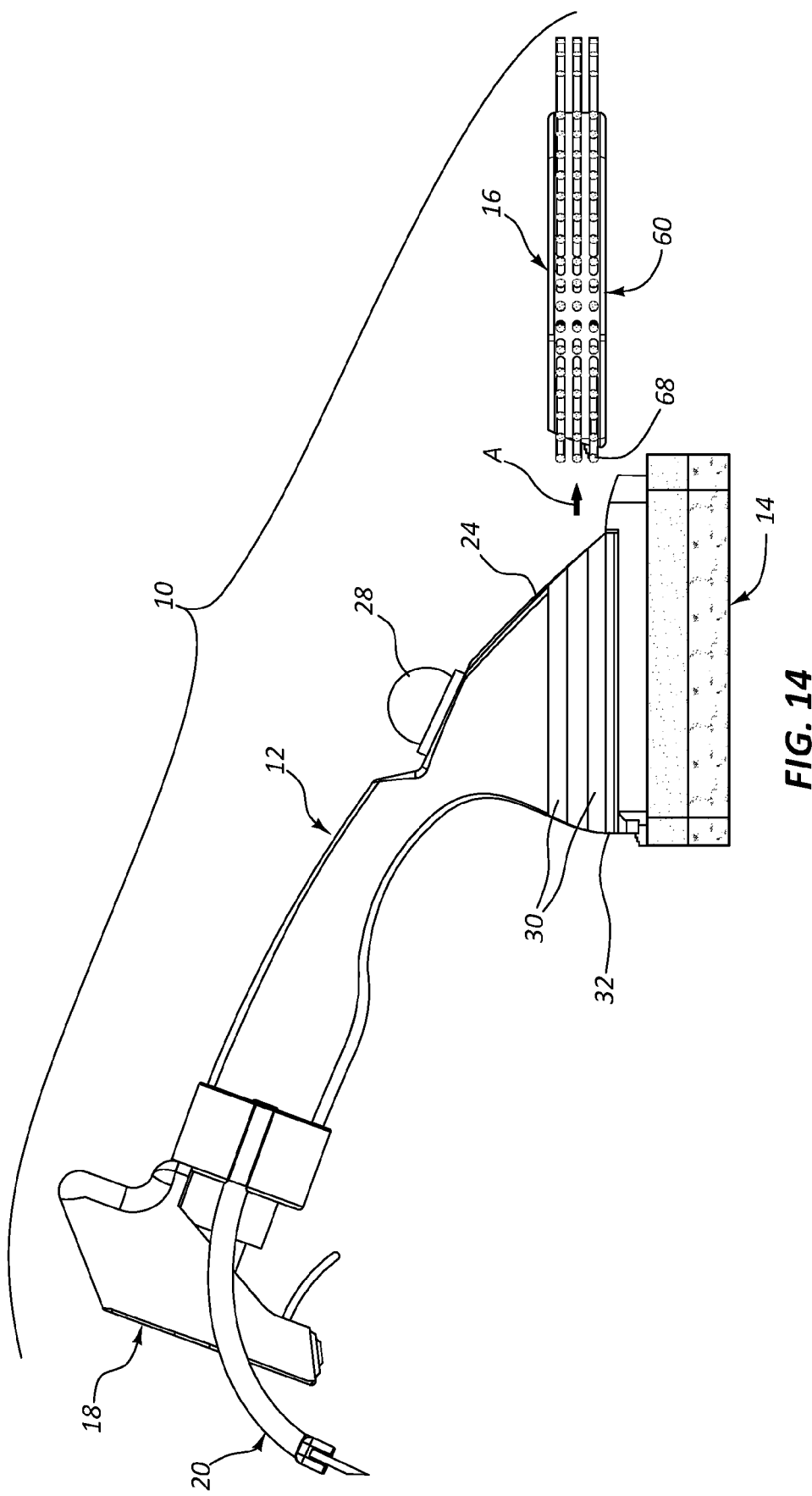
FIG. 14 is another partially exploded side view of the cleaning device of FIG. 1.

FIG. 14 shows another assembly step for assembling features of the cleaning device 10. The bristle assembly 16 is shown detached from the handle 12, while the other features of the cleaning device 10 are assembled together. The handle 12 is advanced in the direction A to insert the bristle mounting track 30 into the track portion 64 of bristle base 60. The handle 12 is advanced until the bristle latch 68 contacts the bristle latch surface 32. Alternatively, the bristle assembly 16 may be moved in a direction opposite the direction A to be inserted onto the handle 12.

Figure 15:
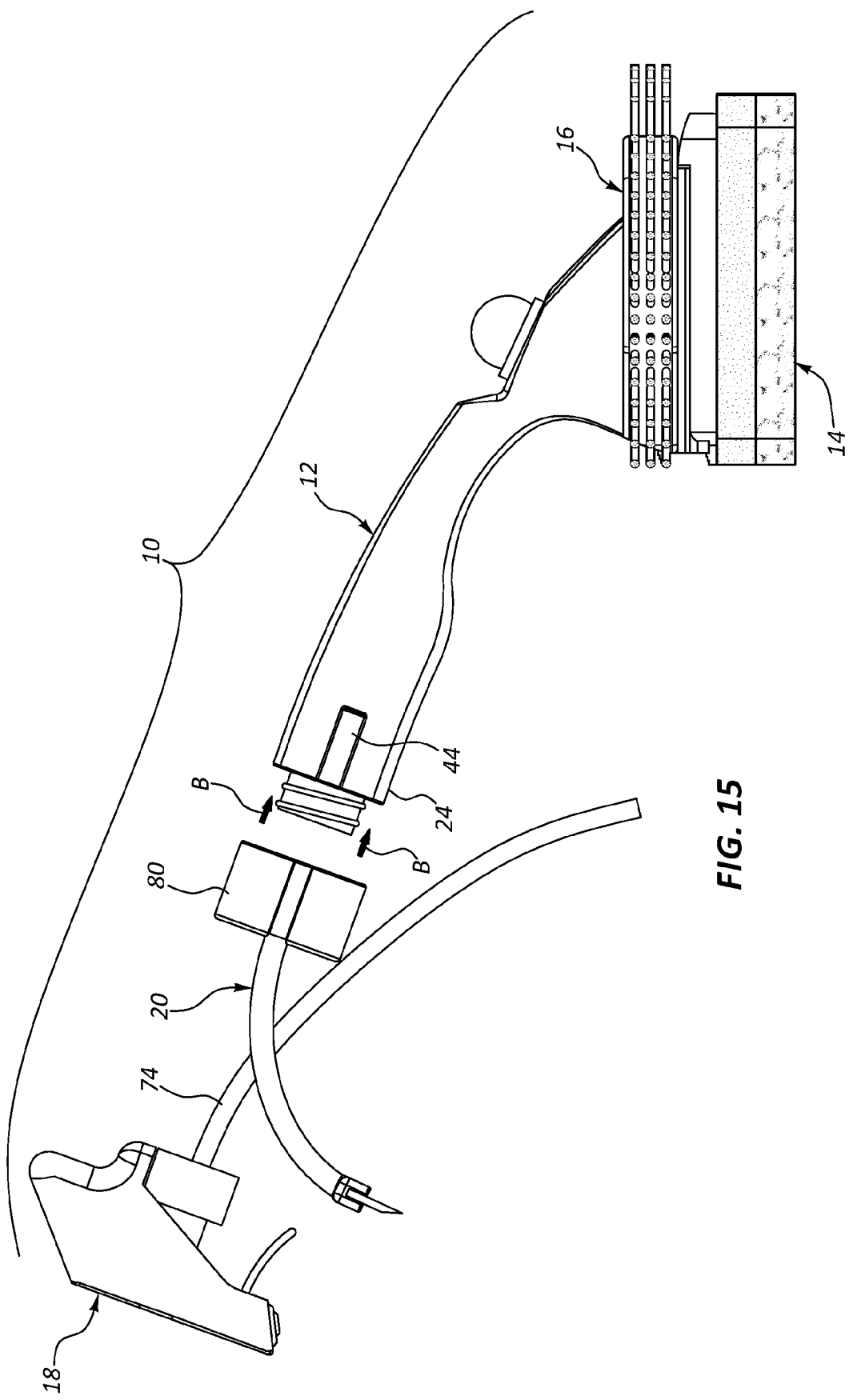
FIG. 15 is another partially exploded side view of the cleaning device of FIG. 1.
Figure 16:
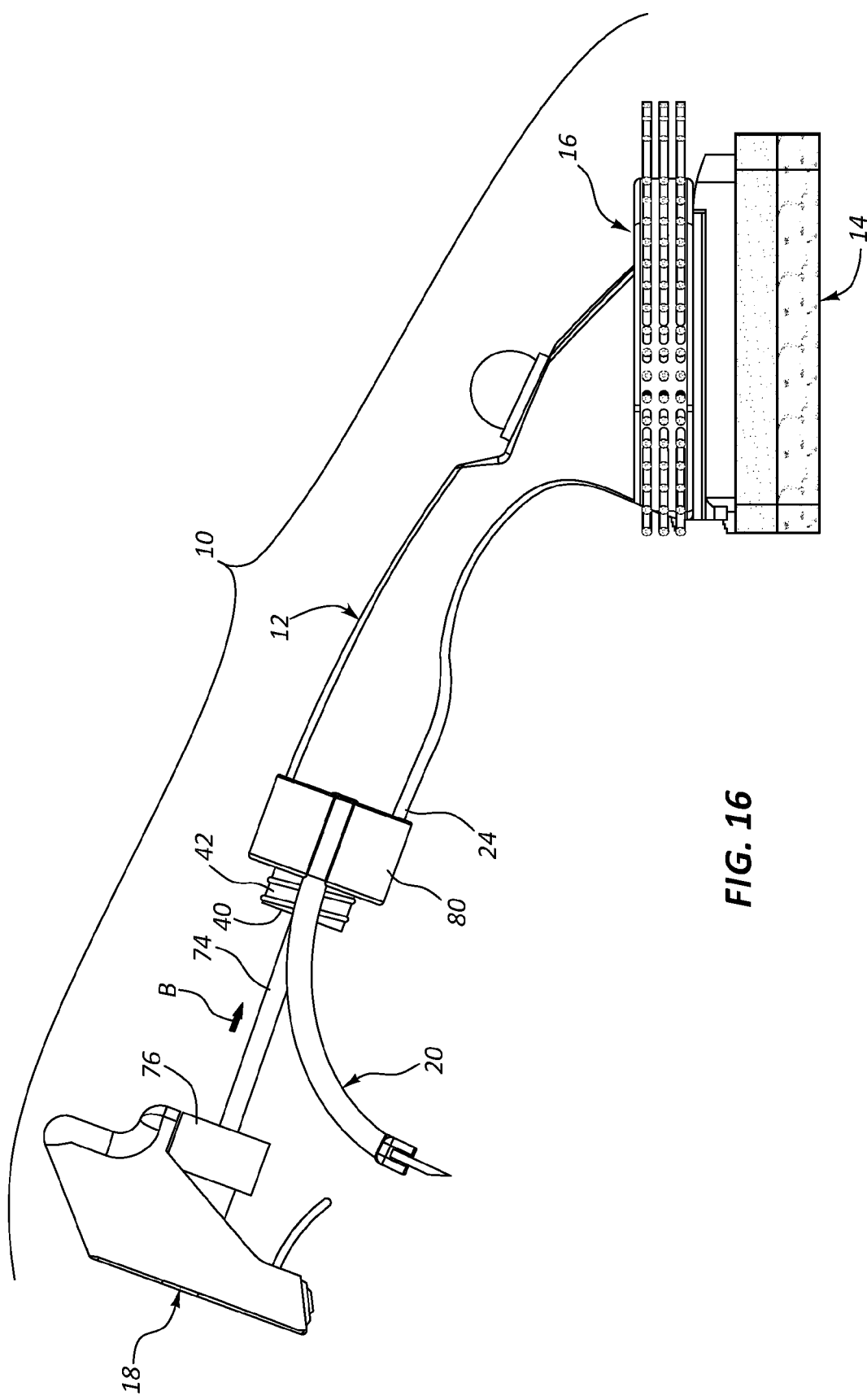
FIG. 16 is another partially exploded side view of the cleaning device of FIG. 1.

FIGS. 15 and 16 show assembly of the spray dispenser 18 and squeegee 20 to the handle 12. Typically, the spray dispenser 18 is detached from handle 12 in order for the squeegee 20 to be mounted to the handle 12. In other arrangements, the base 80 of the squeegee 20 may have a different shape (e.g., a hemispherical rather than a full circle construction) that permits attachment to the handle 12 (e.g., in a lateral direction) while the spray dispenser 18 is mounted to handle 12. In the embodiment of FIGS. 15 and 16, the spray dispenser 18 is removed as shown in FIG. 15, and the squeegee 20 is inserted over the handle 12 in a direction B. The squeegee 20 is moved into a locked position as shown in FIG. 16. The locked position may be defined at least in part by a position of the squeegee mounting features 44 or other connection features that hold the squeegee 20 in a fixed axially position along the handle 12.

The spray dispenser 18 is then mounted to the handle 12 by first inserting the dipstick 74 into the fluid inlet 40 as shown in FIG. 16. The attachment portion 76 is then mounted to the dispenser mounting portion 42 to secure the spray dispenser 18 to the handle 12.

There are numerous cleaning functions possible using the cleaning device 10. FIGS. 17-20 show several examples of cleaning functions using the various features of cleaning device 10. FIG. 17 shows operation of the spray dispenser 18 to spray cleaning fluid 92 on a surface 90 to be cleaned. The cleaning fluid 92 deposited on the surface 90 may alone provide a cleaning function. The cleaning fluid may be removed using a water rinse, cloth or other device separate from cleaning device 10. Alternatively, the cleaning fluid may be removed using other features of cleaning device 10.

FIG. 18 shows the cleaning device 10 being used to remove cleaning fluid 92 from surface 90. The blade 84 of squeegee 20 is held in contact with the surface 90 and the cleaning device 10 is moved in a direction Z to move the blade 84 along the surface 90. The cleaning fluid 92 may be the cleaning fluid dispensed using spray dispenser 18 described with reference to FIG. 17, cleaning fluid dispensed via the sponge assembly 14, cleaning fluid dispensed using a device independent of cleaning device 10, or simply any liquid such as water on any surface of a shower wall or tub. As discussed above, the squeegee 20 may be detachable from handle 12 and operated to provide the squeegee function shown in FIG. 18 while detached from handle 12.

FIG. 19 shows the cleaning device 10 in use scrubbing the surface 90 using sponge assembly 14. The user may grasp the handle 12, press the abrasive surface 56 of the sponge assembly 14 against the surface 90, and move the cleaning device 10 in the direction Z, the direction X, or in rotational motions to scrub the surface 90. The user may operate the pump member 28 to dispense some of the cleaning fluid through sponge assembly 14 and onto the surface 90. As discussed above, the sponge assembly 14 may be detachable from the handle 12 and used independently to scrub the surface 90.

FIG. 20 shows operation of cleaning device 10 to clean surface 90 using the bristle assembly 16. The user may grasp the handle 12, rotate the cleaning device 10 about the axis D of handle 12 until the bristles 62 are facing the surface 90, and then press the bristles 62 against the surface 90. The operator may then move the cleaning device 10 in the direction X, the direction Z, or in rotational motion to scrub the surface 90. The operator may, in advance of scrubbing the surface 90 with bristles 62 apply cleaning fluid 92 using either the spray dispenser 18 or the pump member 28 via the sponge assembly 14, or by using a dispenser separate from the cleaning device 10. The cleaning device 10 is typically rotated about the axis D an angle in the range of about 60° to about 120° relative to the position shown in FIG. 19 in which the abrasive surface is in contact with surface 90.

After scrubbing the surface 90 using either the sponge assembly 14 or bristle assembly 16 as shown in FIGS. 19 and 20, the operator may use the squeegee 20 to remove any deposits on the surface 90. Other methods (e.g., a water rinse, cloth, etc.) are possible to remove the deposits on surface 90 after using the sponge assembly 14 and bristle assembly 16. The bristle assembly 16 may be particularly effective at scrubbing corners and grout lines on a tile surface, or applying additional abrasive force when scrubbing a surface.

Figure 21:
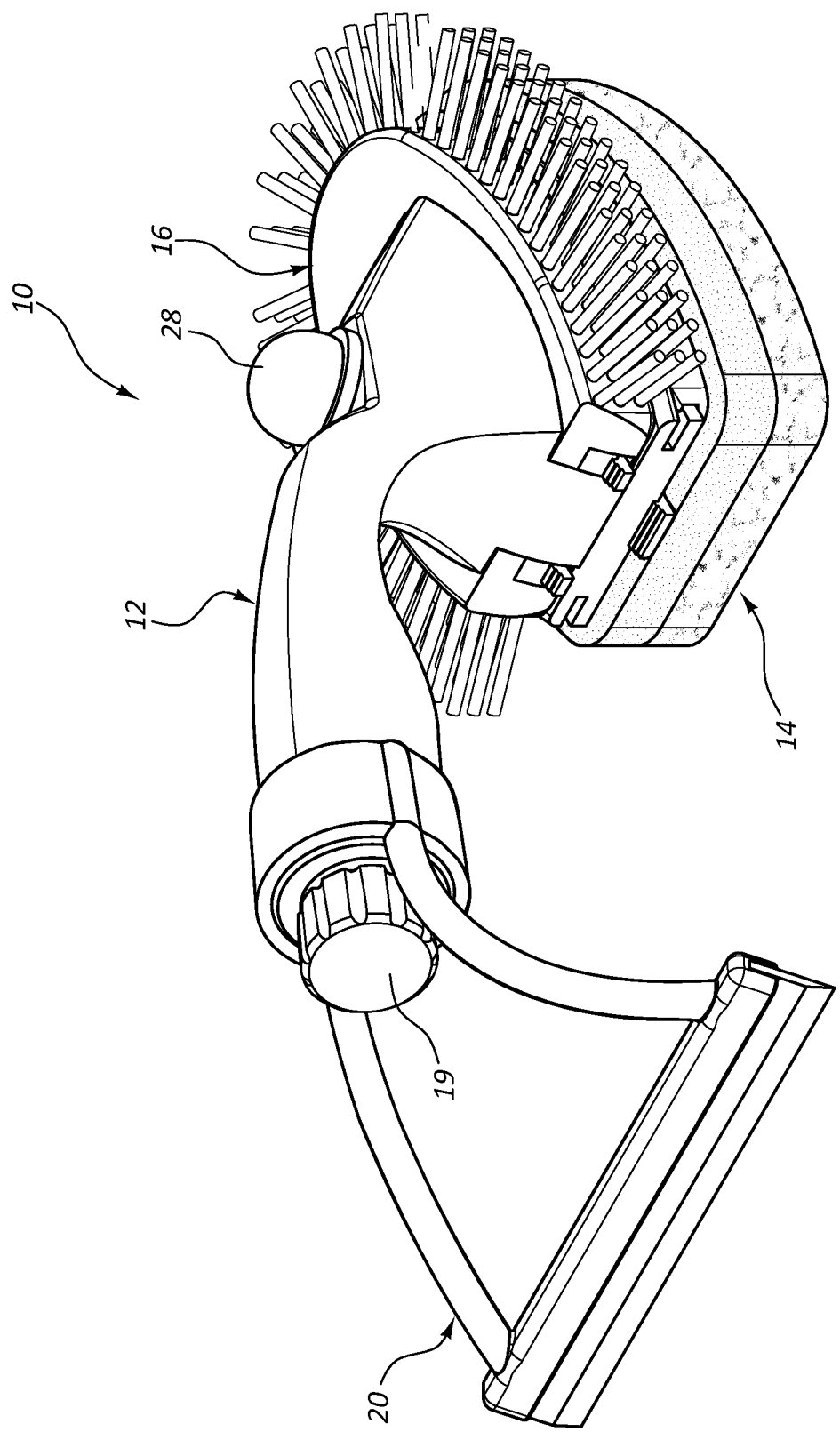
FIG. 21 shows the cleaning device of FIG. 1 with the spray dispenser removed.
Figure 22:
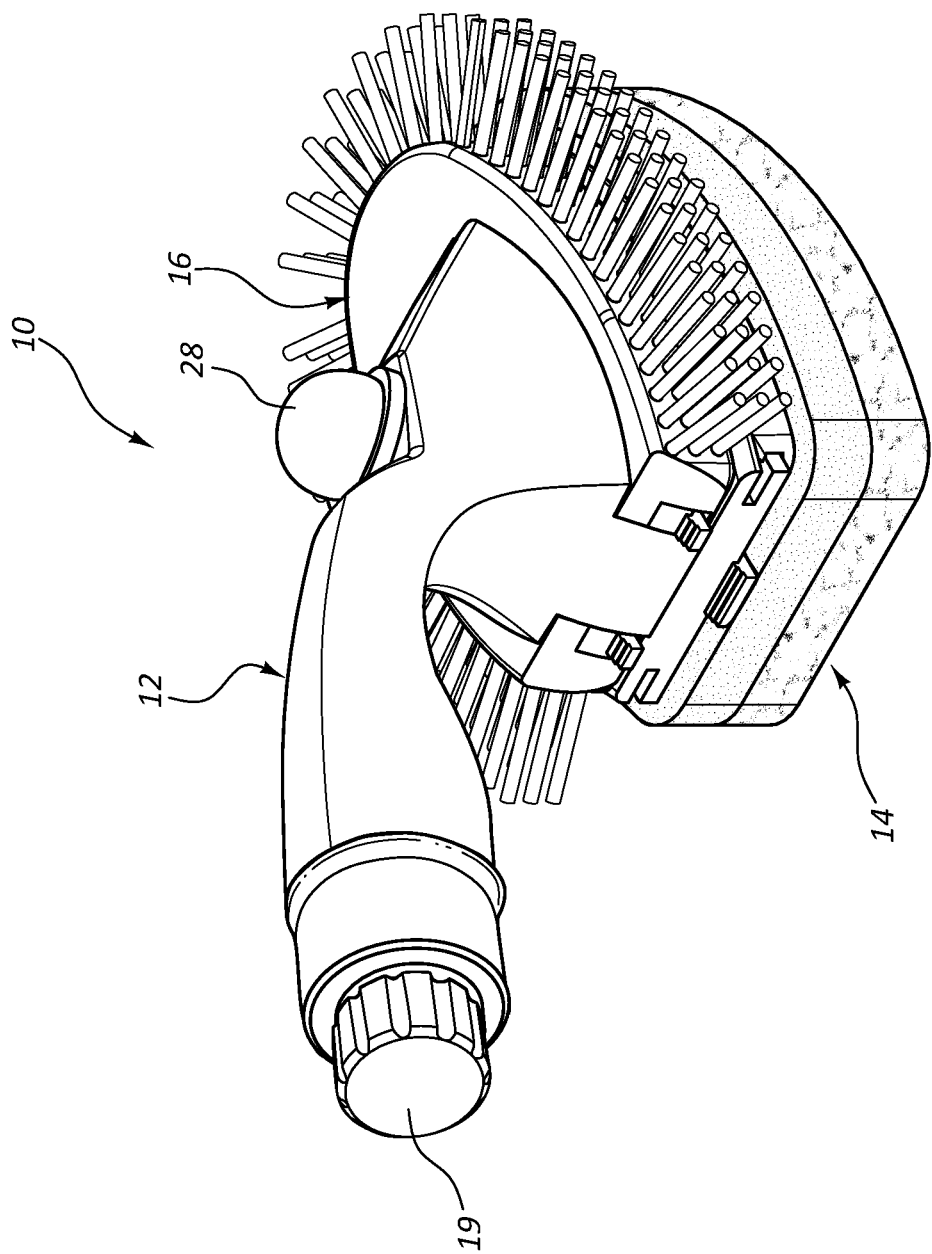
FIG. 22 shows the cleaning device of FIG. 1 with the spray dispenser and squeegee removed.

FIGS. 21 and 22 shows several alternative arrangements for the cleaning device 10 shown in FIG. 1. FIG. 21 shows the cleaning device 10 without the spray dispenser 18 mounted to handle 12. A cap 19 may be mounted to handle 12 in place of spray dispenser 18 to seal closed the handle interior. In at least some arrangements, the cleaning fluid held in handle 12 may be dispensed solely using pump member 28. Alternatively, the cleaning fluid may be dispensed without spray dispenser 18 or pump member 28. For example, the cleaning fluid may automatically flow into sponge assembly 14 upon wetting sponge assembly 14 or compressing and releasing sponge assembly 14.

FIG. 22 shows the cleaning device of FIG. 21 with the squeegee 20 also removed. Squeegee 20 may be removed for use separate from cleaning device 10. In some arrangements, cleaning device 10 may be use entirely without the need for squeegee 20. For example, certain scrubbing functions may be performed with the handle 12, sponge assembly 14 and bristle assembly 16 independent of squeegee 20. In other arrangements, the cleaning device may include spray dispenser 18 and not include the squeegee 20.

In still further embodiments, any one of the features of cleaning device 10 shown in FIGS. 1-12 may be removed from the cleaning device and provided as a separate cleaning device and/or feature, or may be eliminated entirely from the cleaning device 10. For example, pump member 28 may be eliminated and the cleaning fluid dispensed only with spray dispenser 18. The pump member 28 may be replaced with a cap (e.g., cap 19) to seal the interior of handle 12. Alternatively, pump opening 31 (see FIG. 9) may also be eliminated from handle 12 (e.g., see FIGS. 25-26). The pump member 28 may be permanently mounted to handle 12, or may be releasably mounted (e.g., with a screw/threaded connection). The pump member 28 may be mounted to an exterior surface of handle 12 or inserted into a cavity and mounted to an internal surface of handle 12. As described herein, a separate seating and/or securing feature may be interposed between handle 12 and pump member 28 to provide an interface there between.

Additionally, or alternatively, at least one of the sponge assembly 14 and bristle assembly 16 may be eliminated or mounted separately and independently to handle 12 and usable independently of the other being mounted to handle 12. In still further embodiments, some of the features shown in FIGS. 1-12 may be permanently mounted to handle 12, such as being integrally formed with handle 12 or fixed using a permanently connection method such as adhesives, welding, or co-molding.

In some embodiments, the cleaning fluid typically held in handle 12 is eliminated from cleaning device 10. The cleaning fluid may be provided separately from cleaning device 10, such as by a separate spray or squirt bottle, or by a container of powered abrasive cleaner. The handle 12 may have a solid construction along all or portions of its length in the event handle 12 is not required to hold a cleaning fluid. The handle 12 and other portions of cleaning device 10 may comprise other materials if not cleaning device 10 is not required to hold and dispense a cleaning fluid.

Figure 23:
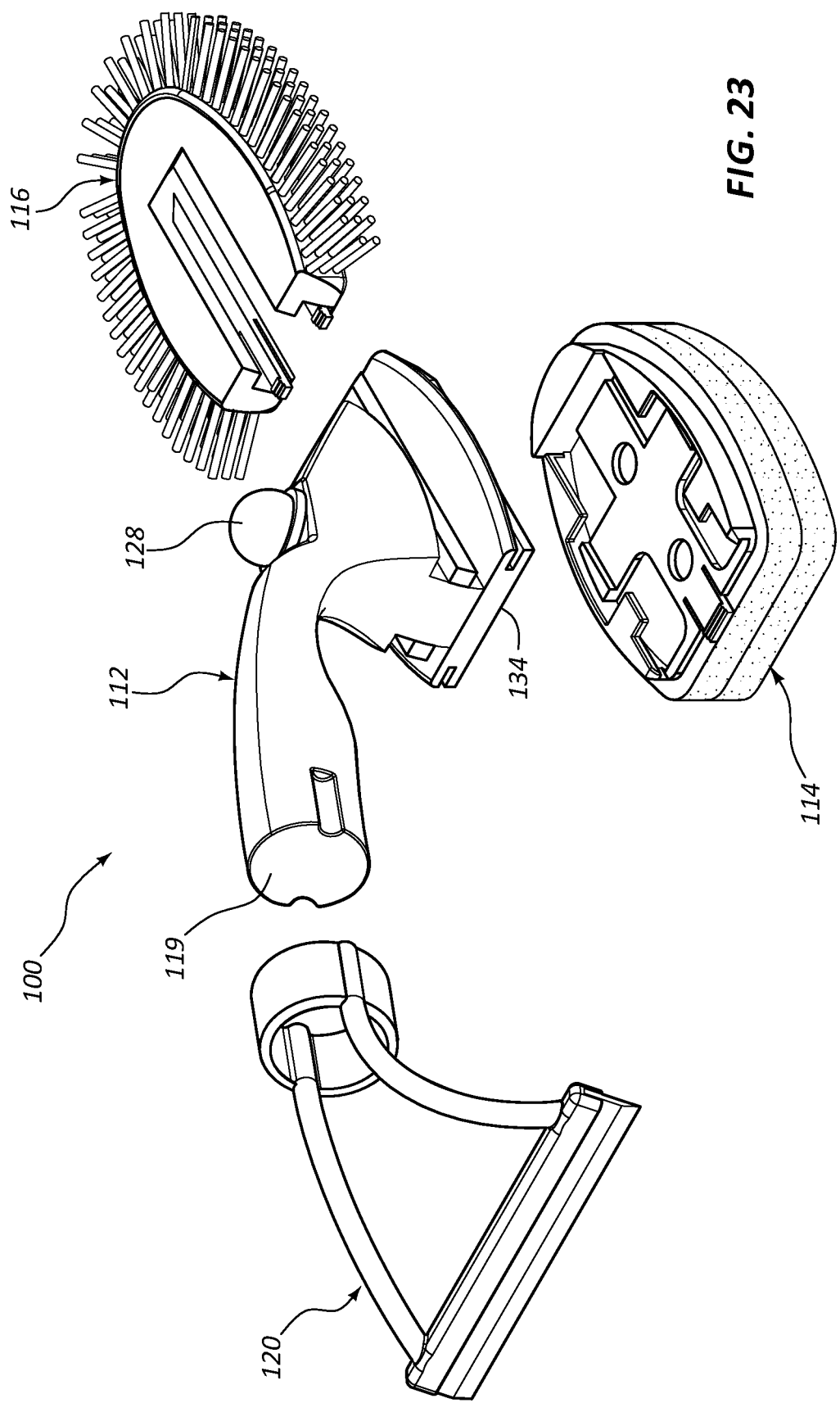
FIG. 23 is an exploded top perspective view of another example cleaning device in accordance with the present disclosure.
Figure 24:
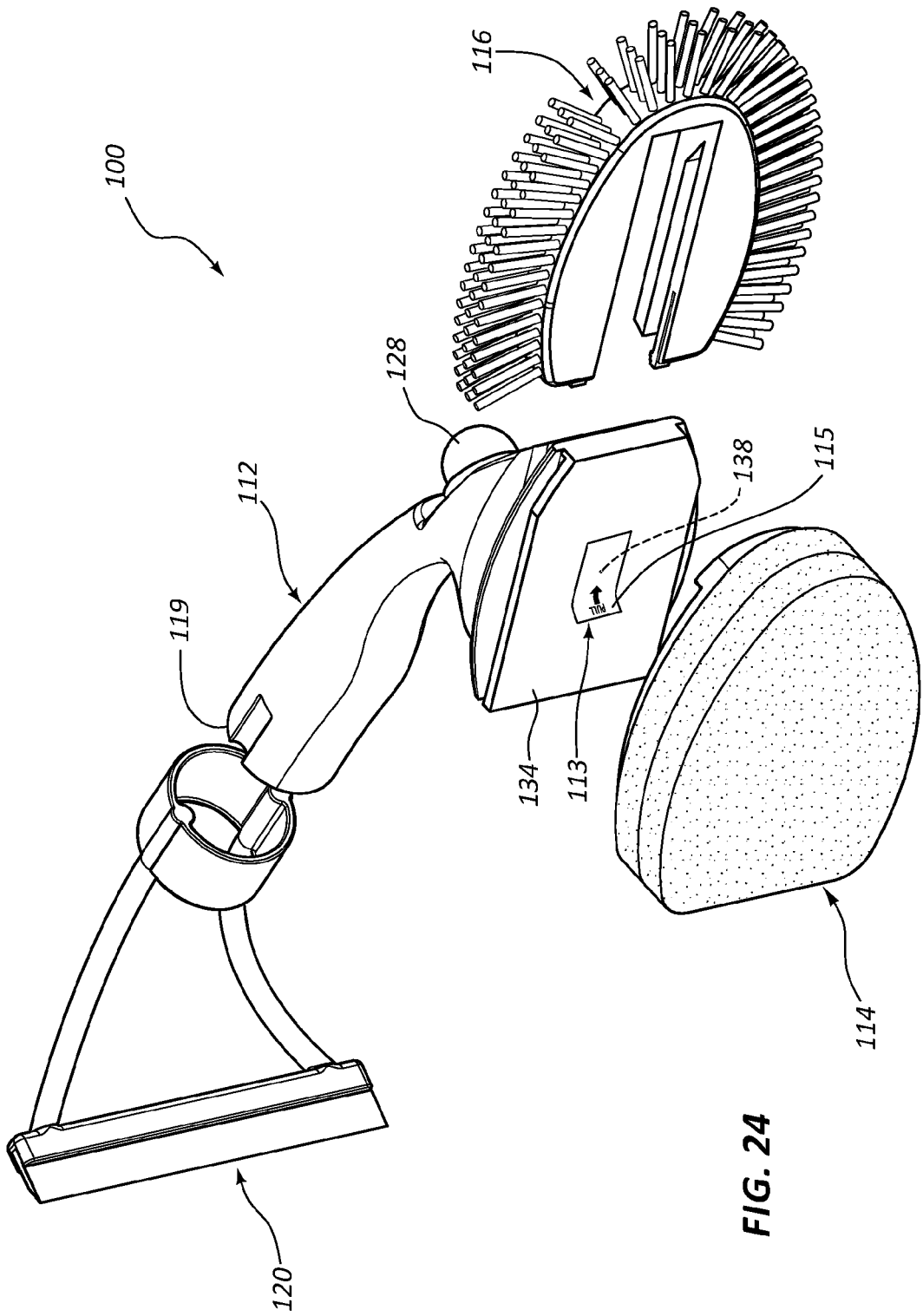
FIG. 24 is an exploded bottom perspective view of the cleaning device of FIG. 23.

Referring now to FIGS. 23-24, another example cleaning device 100 is shown and described. Cleaning device 100 includes a handle 112, a sponge assembly 114, a bristle assembly 116, a squeegee 120, and a pump 128. The components of cleaning device 100 are shown in exploded top and bottom views in FIGS. 23-24. The sponge assembly 114, bristle assembly 116, squeegee 120, and pump 128 may be mounted independently and separately to handle 112 and may be used in any combination with handle 112.

Handle 112 may have a sealed proximal end 119 that does not include an opening as is included in handle 12 described above. In some examples, handle 112 is originally formed with a hole at proximal end 119, but the hole is covered or filled to seal the hole in a permanent way. For example, the cap 19 described with reference to FIGS. 21 and 22 may cover a hole at proximal end 119 and permanently connected to handle to provide a permanent seal of the hole. In other examples, handle 112 is formed with a continuous, uninterrupted construction along the proximal end 119 as shown in FIGS. 23 and 24. Handle 112 may be formed using a molding, casting, or shaping process that creates the continuous, sealed structure along proximal end 119.

Handle 112 may have a fill opening (e.g., see pump opening 31 shown in FIG. 9) associated with pump 128, and a dispense opening 138 formed in sponge mounting surface 134. The handle 112 may be filled with cleaning fluid through the fill opening. Once the handle 112 is filled with cleaning fluid, the fill opening may be sealed closed by mounting pump 128 to handle 112. In at least some examples, pump 128 is permanently mounted to handle 112 to provide a permanent sealing of the fill hole.

Additionally, or alternatively, handle 112 may be filled with cleaning fluid through pump 128. Pump 128 may comprising a pierceable, resealable material that permits piercing by a needle or other filling device that provides access through pump 128 into an interior of handle 112 for purposes of filling handle 112. One of the needle or other filling device is removed from pump 128, the material of pump 128 may reseal to prevent exit of the cleaning fluid from the handle 112 through pump 128. In this way, pump 128 may be permanently mounted to handle 112 prior to filling handle 112 with cleaning fluid. Pump 128 may be integrally formed with handle 112 using, for example, adhesives, welding, or co-molding in a preliminary step before filling handle 112 with cleaning fluid, which may have the benefit of avoiding exposure of the cleaning fluid to conditions required for the permanent connection of pump 128 to handle 112. Generally, a permanent connection as it relates to pump 128 being connected to handle 112 is a connection which, if broken or undone, would damage pump 128 or handle 112, or at least require significant time and/or effort to create a disconnection, as opposed to a simple twist off connection or release of a snap-fit connection.

Cleaning device 100 may also include a seal layer 113 that temporarily seals dispense opening 138 (see FIG. 24). Seal layer 113 may include a removable film or other sealing material. Seal layer 113 may be mounted to an exterior surface of handle 112 at a location surrounding and providing a seal around dispense opening 138. Seal layer 113 may include a grasping or tab portion 115 to provide easier removal of seal layer 113 prior to using cleaning device 100 for cleaning. In arrangements in which sponge assembly 114 is to be used with handle 112, seal layer 113 may be removed prior to connecting sponge assembly 114 to handle 112. In arrangements with cleaning device 100 is used with sponge assembly 114, seal layer 113 may still be removed in order to dispense cleaning fluid through dispense opening 138 and onto a surface to be cleaned.

Handle 112 may be filled through seal layer 113. For example, a needle or other filling device may pierce through seal layer and fill the interior of handle 112 with cleaning fluid. Seal layer 113 may reseal upon removal of the filling device in order to prevent flow of the cleaning fluid out through dispense opening 138 until seal layer 113 is removed. Alternatively, handle 112 may be filled through dispense opening 138 prior to mounting seal layer 113. In still further embodiments, dispense opening 138 is sufficiently small to stop flow of the cleaning fluid out through dispense opening 138 unless a pressure condition within the handle interior is substantially increased (e.g., upon operation of pump 128). As such, the seal layer 113 may not be required in some arrangements in order to retain the cleaning fluid within handle 112 prior to use of cleaning device 100.

While seal layer 113 is shown as a removable film that is mounted to the outside surface of handle 112, other embodiments may provide temporary sealing of dispense opening 138 in other ways. For example, a film or other sealing material may be positioned along an internal surface of handle 112 and covering dispense opening 138. In further examples, a plug, cap, adhesive, or other material or structure may be used to seal dispense opening 138, and may be mounted either permanently or releasably to handle 112. In some examples, mounting sponge assembly 114 to handle 112 may automatically open dispense opening 138 to permit dispensing of the cleaning fluid.

Seal layer 113 may provide advantages when handle 112 is provided as a standalone, separately purchased product that is pre-filled with cleaning fluid. The use of seal layer 113, along with the sealed proximal end 119 and the permanent connection of pump 128 to handle 112, may assist in retaining the cleaning fluid within handle 112 until the consumer is ready to use handle 112 (alone or in combination with any of sponge assembly 14, bristle assembly 116, and squeegee 120). Handle 112, along with any of sponge assembly 14, bristle assembly 116, and squeegee 120, may be sold separately as replacement parts for cleaning device 100. Handle 112 may be sold separately when filled with cleaning fluid or when empty.

In some embodiments, dispense opening 138 is sealed closed with a thin layer of the material from which handle 112 is formed. The thin layer may be manually pierced by the consumer prior to attempting to dispense cleaning fluid from handle 112. In some examples, one of the other components of cleaning device 100 may include a piercing member that can be used to open dispense opening 138.

Figure 25:
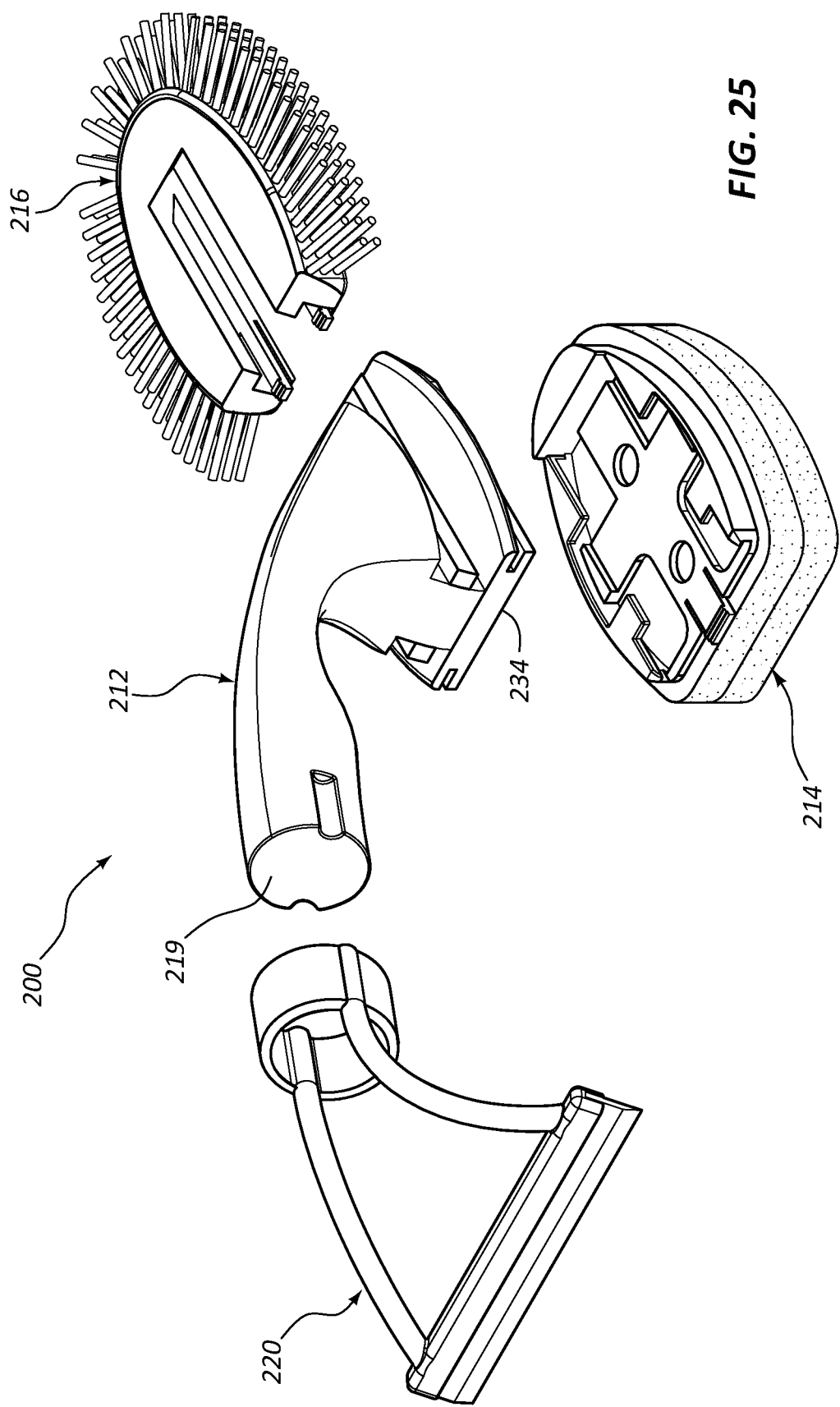
FIG. 25 is an exploded top perspective view of another example cleaning device in accordance with the present disclosure.
Figure 26:
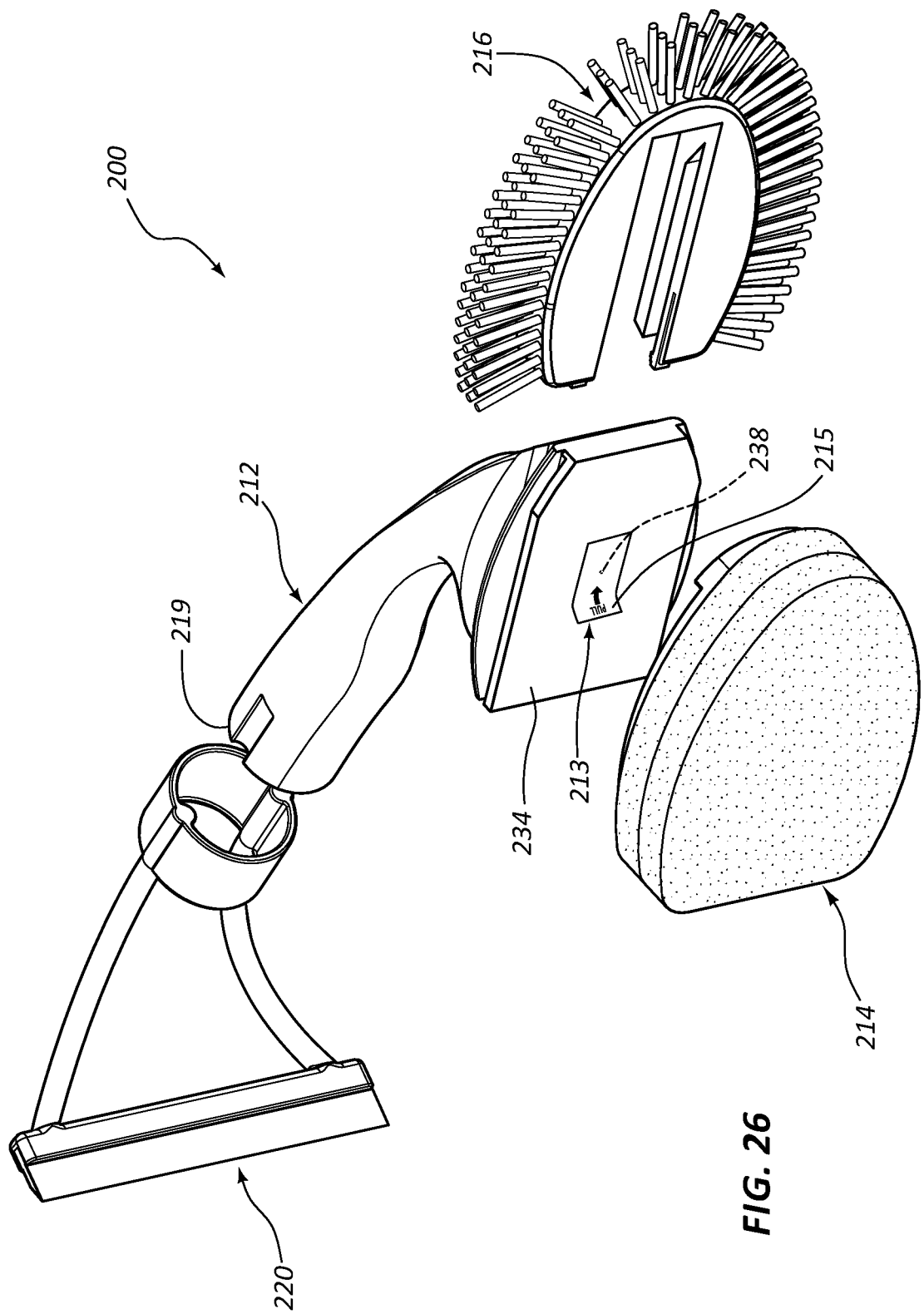
FIG. 26 is an exploded bottom perspective view of the cleaning device of FIG. 23.

Referring now to FIGS. 25-26, another example cleaning device 200 is shown and described. Cleaning device 200 includes a handle 212, a sponge assembly 214, a bristle assembly 216, and a squeegee 120. The components of cleaning device 200 are shown in exploded top and bottom views in FIGS. 25-26. The sponge assembly 214, bristle assembly 216, and squeegee 220 may be mounted independently and separately to handle 212 and may be used in any combination with handle 212.

Handle 212 is sealed at its proximal end 219 and has a dispense opening 238 formed in a sponge mounting surface 234 at its distal end. Cleaning device 200 may be operable to dispense cleaning fluid through dispense opening 138 without a fluid dispensing device such as spray dispenser 18 shown in FIG. 1 or the pumps 28, 128 shown in FIGS. 1 and 24, respectively. Cleaning device 200 may include a seal layer 213 or similar structure to maintain a sealed interior of handle 212 to retain the cleaning fluid held in handle 212 until the consumer is ready to use cleaning device 200. Seal layer 213 may include a grasping or tab portion 215 to provide easier removal of seal layer 113 prior to using cleaning device 200 for cleaning. Once seal layer 213 (or similar sealing structure, as discussed above related to seal layer 113) is removed or modified in a way to permit the cleaning fluid to be dispensed from handle 212, the cleaning fluid may automatically flow out of dispense opening 238. The automatic flow of cleaning fluid may occur due to gravity forces (e.g., when handle 212 is held upright—see FIG. 17) or horizontally (e.g., see FIG. 12).

In other embodiments, portions of handle 212 may be flexible and/or deformable to permit application of a compression force to handle 212 by a user that increases a pressure condition in the handle interior that forces the cleaning fluid out of the dispense opening 138. A pump feature may be integrated into the structure of handle 212 to provide a pumping function without having to mount a separate pump (e.g., pump 128 described above) to handle 212. The elimination of a separate pump member from cleaning device 200 may provide advantages related to simplified manufacturing and assembly, reduced number of parts, reduced costs, and easy of sealing closed the interior of handle 212 for purposed of retaining the cleaning fluid prior to using cleaning device 200.

The handle 212 may be filled with cleaning fluid in a number of ways including, for example, filling through dispense opening 238, or filling through a separate resealable portion of handle 212 (e.g., a resealable plug integrally formed in the handle e.g., at proximal end 219). Filling handle 212 may require filling equipment, methods, and knowhow that is not typically available to consumers. As such, consumers may be required to replace handle 212 in order to obtain additional cleaning fluid and continue use of cleaning device 200.

Handles 112, 212 may be provided as a separately sold unit that is filled with a cleaning fluid. Once the cleaning fluid held in handles 112, 212 is dispensed, the handles 112, 212 typically cannot be refilled, which requires replacing handle 112, 212 in order to have a source of the cleaning fluid.

Other cleaning device embodiments are possible in addition to those illustrated in the embodiments. For example, a cleaning device having spray dispenser 18 permanently mounted to the handle 12 may provide a sealed interior of handle 12 for purposed of holding volume of cleaning fluid until the time of use. The handle 12 and spray dispenser 18 may be provided as a separately sold unit.

INDUSTRIAL APPLICABILITY

One aspect of the present disclosure relates to a cleaning device that includes a handle, a scrubbing member, and a spray dispenser. The handle includes first and second end portions and a hollow interior configured to hold a cleaning fluid. The scrubbing member is positioned at the first end portion of the handle and arranged in flow communication with the hollow interior. The spray dispenser is positioned at the second end portion of the handle and arranged in flow communication with the hollow interior. The spray dispenser is operable to dispense the cleaning fluid.

The spray dispenser may be configured to dispense the cleaning fluid in at least one of a spray pattern and a stream. The cleaning device may further include a plurality of bristles mounted to the handle. The scrubbing member may include an abrasive surface and the plurality of bristles may extend parallel to the abrasive surface. The handle may include a pump member operable to increase a pressure condition in the hollow interior to deliver the cleaning fluid to the scrubbing member. The pump member may include a thumb actuated member. The handle may include a translucent or transparent material to permit visualization of the cleaning fluid through a wall of the handle. The plurality of bristles may be mounted to a bristle base, and the bristle base may be detachable mounted to the first end of the handle.

The spray dispenser may include a spray handle movable to pump the cleaning fluid, a nozzle through which the cleaning fluid is dispensed, and a dip stick extending into the hollow interior. The cleaning device may further include a squeegee mounted to the handle. The squeegee may extend from the second end of the handle. The squeegee may be removably mounted to the handle. The squeegee may be mounted to the handle at a location between the spray dispenser and the scrubbing member. The scrubbing member may include a sponge material. The scrubbing member may include a rigid base portion and at least one sponge member mounted to the base portion. The sponge member may include a contoured peripheral shape and a planar abrasive surface. The base portion may be releasably mounted to the handle.

Another aspect of the present disclosure relates to a cleaning device including a handle, a scrubber assembly, a fluid dispenser, and a squeegee. The handle includes a hollow interior configured to hold a cleaning fluid. The scrubber assembly is mounted to a first end of the handle and arranged in flow communication with the hollow interior. The fluid dispenser is mounted to a second end of the handle and arranged in flow communication with the hollow interior. The squeegee is mounted to the handle.

The scrubber assembly may include a sponge portion and a bristles portion. The fluid dispenser may be operable to spray a flow of the cleaning fluid. The squeegee may be mounted to the handle between the scrubber assembly and the fluid dispenser. The bristles portion may include a bristles base and a plurality of bristles mounted to the bristles base, wherein the bristles base is mountable to the handle separate from the sponge portion. In some embodiments, at least some of the plurality of bristles are mounted directly to the handle rather than to a separate bristles base. The sponge portion may include a sponge base and a sponge member, the sponge base being mountable to the handle separate from the bristles portion.

The cleaning device may further include a pump mounted to the handle and operable to dispense the cleaning fluid from the hollow interior into the scrubber assembly. The scrubber assembly may include at least first and second abrasive members each having a different structure and material composition. The sponge portion and the bristles portion may be independently releasably mounted to the handle.

A further aspect of the present disclosure relates to a method of assembling a cleaning device. The method includes providing a cleaning device having a handle having a hollow interior configured to hold at least one fluid, a scrub member, a dispenser, and squeegee, mounting the scrub member to a first end of the handle, mounting the dispenser to a second end of the handle and in flow communication with the hollow interior, and mounting the squeegee to the handle.

The handle may include first and second portions, the scrub member may be mounted to the first portion, and the dispenser may be mounted to the second portion and define at least a portion of the hollow interior. The method may include releasably attaching the first portion to the second portion. Mounting the dispenser may include releasably mounting the dispenser, wherein the dispenser, when detached from the handle, provides access to the hollow interior. The scrub member may include a base portion and an abrasive portion, the base portion may be mounted to the handle, and the method may include releasably mounting the abrasive portion to the base portion to provide replacement of the abrasive portion.

The scrub member may include a plurality of bristles permanently mounted to the base portion. The squeegee may be adjustably mounted to the handle between an retracted position and an operable position. The cleaning device may further include a pump mounted to the handle and operable to deliver the at least one fluid to the scrub member.

A further aspect of the present disclosure relates to a method of cleaning. The method includes providing a cleaning device comprising a handle configured to hold a cleaning fluid, a scrubber assembly, a fluid dispenser, and a squeegee, wherein the scrubber assembly includes at least first and second scrubbing structures. The method further includes delivering cleaning fluid to the scrubber assembly, scrubbing a first face with the first scrubbing structure, scrubbing the first surface with the second scrubbing structure, operating the fluid dispenser to spray the first surface with the cleaning fluid, and removing fluid from the first surface with the squeegee.

The method may further include adjusting an orientation of the scrubber assembly between about 60° and 120° about a longitudinal axis of the handle between scrubbing the first surface with the first scrubbing structure and scrubbing the first surface with the second scrubbing structure. The first surface may include a surface of a bathtub or shower. Removing fluid may include removing standing water left over from a bath or shower. The first scrubbing structure may include a sponge having an abrasive surface, and the second scrubbing structure may include a plurality of bristles. Removing fluid may include removing the cleaning fluid after scrubbing the first surface with at least one of the first and second scrubbing structures.

Another aspect of the present disclosure relates to a method of cleaning that includes providing a cleaning device comprising a handle a chamber holding a cleaning fluid, a scrubber assembly mounted to the handle and having flow communication with the chamber, and a dispenser mounted to the handle and having flow communication with the chamber. The method further includes delivering the cleaning fluid to the scrubber assembly, scrubbing at least one surface using the scrubber assembly and the delivered cleaning fluid, operating the dispenser to spray the at least one surface with the cleaning fluid, and scrubbing the at least one surface with the scrubber assembly and the sprayed cleaning fluid.

The cleaning device may further include a squeegee, and the method comprises removing fluids from the at least one surface with the squeegee. The squeegee may extend from a first end of the handle, the dispenser may be positioned at the first end of the handle, and the scrubber assembly may be positioned at a second end of the handle. The scrubber assembly may include first and second scrubbing portions, wherein the second scrubbing portion has a greater stiffness than the first scrubbing portion. Scrubbing the at least one surface may include holding the cleaning device in a first orientation while scrubbing with the first scrubbing portion, and holding the cleaning device in a different, second orientation while scrubbing with the second scrubbing portion.

One aspect of the present disclosure relates to a cleaning device that includes a handle, a scrubbing member, a plurality of bristles, and a fluid dispenser. The handle includes first and second end portions and a hollow interior configured to hold a cleaning fluid. The scrubbing member is positioned at the first end portion of the handle and arranged in flow communication with the hollow interior. The plurality of bristles are mounted to the handle. The fluid dispenser is positioned on the handle and arranged in flow communication with the hollow interior. The fluid dispenser is operable to dispense the cleaning fluid.

The fluid dispenser may be configured to dispense the cleaning fluid into the scrubbing member. The scrubbing member may include an abrasive surface and the plurality of bristles extend parallel to the abrasive surface. The fluid dispenser may include a pump member operable to increase a pressure condition in the hollow interior to deliver the cleaning fluid to the scrubbing member. The pump member may include a thumb actuated member. The fluid dispenser may include a spray dispenser configured to dispense the cleaning fluid as a spray, and a pump configured to deliver the cleaning fluid to the scrubbing member. The handle may include a translucent or transparent material to permit visualization of the cleaning fluid through a wall of the handle. The plurality of bristles may be mounted to a bristle base, and the bristle base may be detachably mounted to the first end portion of the handle.

The fluid dispenser may include a spray dispenser having a spray handle movable to pump the cleaning fluid, a nozzle through which the cleaning fluid is dispensed, and a dip stick extending into the hollow interior. The cleaning device may include a squeegee mounted to the second end portion of the handle. The squeegee may extend from the second end portion of the handle. The squeegee may be removably mounted to the handle. The squeegee may include a rubber blade. The scrubbing member may include a sponge material. The scrubbing member may include a rigid base portion and at least one sponge member mounted to the base portion. The at least one sponge member may include a contoured peripheral shape and a planar abrasive surface. The rigid base portion may be releasably mounted to the handle.

Another aspect of the present disclosure relates to a cleaning device that includes a handle, a scrubber assembly, and a squeegee. The handle includes a hollow interior configured to hold a cleaning fluid. The scrubber assembly is mounted to a first end of the handle and arranged in flow communication with the hollow interior. The squeegee is mounted to the handle.

The scrubber assembly may include a sponge portion and a bristles portion. The cleaning device may include a fluid dispenser mounted to a second end of the handle and arranged in flow communication with the hollow interior, wherein the fluid dispenser is configured to dispense the cleaning fluid. The fluid dispenser may be operable to spray a volume of the cleaning fluid. The fluid dispenser may include a pump configured to increase pressure in the hollow interior to deliver the cleaning fluid to the scrubber assembly. The bristles portion may include a bristles base and a plurality of bristles mounted to the bristles base, wherein the bristles base is mountable to the handle separate from the sponge portion. The sponge portion may include a sponge base and a sponge member, wherein the sponge base is mountable to the handle separate from the bristles portion. The scrubber assembly may include at least first and second abrasive members each having a different material composition. The sponge portion and the bristles portion may be independently releasably mounted to the handle.

A further aspect of the present disclosure relates to a method of assembling a cleaning device. The method includes providing a cleaning device having a handle having a hollow interior configured to hold at least one fluid, a scrubbing member, and squeegee, mounting the scrub member to a first end of the handle, and mounting the squeegee to a second end of the handle.

The method may further include providing a fluid dispenser operable to dispense the at least one fluid from the cleaning device, and mounting the fluid dispenser to the handle. Mounting the dispenser may include releasably mounting the fluid dispenser, wherein the fluid dispenser, when detached from the handle, provides access to the hollow interior. The scrubber member may include a base portion and an abrasive portion, the base portion being mounted to the handle, and the method comprises releasably mounting the abrasive portion to the base portion to provide replacement of the abrasive portion. The scrubber member may include a plurality of bristles permanently mounted to the base portion. The fluid dispenser may include a pump, the pump being operable to deliver the at least one fluid to the scrubber member.

A further aspect of the present disclosure relates to a method of cleaning. The method includes providing a cleaning device comprising a handle configured to hold a cleaning fluid, a scrubber assembly, a fluid dispenser, and a squeegee, the scrubber assembly comprising at least first and second scrubbing structures. The method further includes operating the fluid dispenser to dispense the cleaning fluid, scrubbing with the first scrubbing structure, scrubbing with the second scrubbing structure, and removing fluid with the squeegee.

Removing fluid may include removing standing water left over from a bath or shower. The first scrubbing structure may include a sponge having an abrasive surface, and the second scrubbing structure may include a plurality of bristles. Operating the fluid dispenser may include depressing a pump to deliver cleaning fluid to the scrubber assembly. Operating the fluid dispenser may include operating a spray dispenser to spray the cleaning fluid.

One aspect of the present disclosure relates to a cleaning device that includes a handle, a cleaning fluid, a scrubbing member, and a plurality of bristles. The handle includes first and second end portions and a hollow interior. The cleaning fluid is retained in the hollow interior. The scrubbing member is mounted to the first end portion of the handle and arranged in flow communication with the hollow interior. The plurality of bristles are mounted to the handle.

The handle may be sealed with the cleaning fluid retained therein, wherein the cleaning fluid being dispensed from the handle into the scrubbing member. The cleaning device may include a fluid dispenser positioned on the handle and arranged in flow communication with the hollow interior, wherein the fluid dispenser is operable to dispense the cleaning fluid into the scrubbing member. The cleaning device may include a pump member mounted to the handle and operable to increase a pressure condition in the hollow interior to deliver the cleaning fluid to the scrubbing member. The pump member may include a thumb actuated member. The pump member may be permanently mounted to the handle after filling the hollow interior with the cleaning fluid. The hollow interior may be fillable with the cleaning fluid through the pump member.

The plurality of bristles may be mounted to a bristle base, and the bristle base may be detachably mounted to the first end portion of the handle. The scrubbing member may be releasable mounted to the handle. The cleaning device may include a squeegee mounted to the second end portion of the handle. The squeegee may extend away from the handle. The squeegee may be removably mounted to the handle. The squeegee may include a rubber blade. The scrubbing member may include a sponge material. The scrubbing member may include a rigid base portion and at least one sponge member mounted to the rigid base portion. The at least one sponge member may include a contoured peripheral shape and a planar abrasive surface. The rigid base portion may be releasably mounted to the handle.

Another aspect of the present disclosure relates to a cleaning device that includes a handle and a scrubber assembly. The handle includes a hollow interior configured to hold a cleaning fluid. The scrubber assembly is mounted to a first end of the handle and arranged in flow communication with the hollow interior. The handle is configured to be sealed after being filled with the cleaning fluid, wherein the cleaning fluid exits the hollow interior directly into a portion of the scrubber assembly.

The scrubber assembly may include a sponge portion and a bristles portion. The cleaning device may include a fluid dispenser mounted to the handle and arranged in flow communication with the hollow interior, wherein the fluid dispenser is configured to dispense the cleaning fluid. The fluid dispenser may be operable to spray a volume of the cleaning fluid. The fluid dispenser may include a pump configured to increase pressure in the hollow interior to deliver the cleaning fluid to the scrubber assembly. The pump may be permanently mounted to the handle. The sponge portion may include a sponge base and a sponge member, wherein the sponge base is mountable to the handle separate from the bristles portion. The scrubber assembly may include at least first and second abrasive members each having a different material composition. The sponge portion and the bristles portion may be independently releasably mounted to the handle.

Another aspect of the present disclosure relates to a method of assembling a cleaning device. The method includes providing a cleaning device having a handle with a hollow interior, and a scrubbing member, filling the handle with cleaning fluid, sealing the handle, and mounting the scrubbing member to a first end of the handle.

The method may also include mounting a squeegee to a second end of the handle. The method may include mounting a fluid dispenser to the handle, wherein the fluid dispenser is operable to dispense the cleaning fluid from the cleaning device. Mounting the fluid dispenser may include releasably mounting the fluid dispenser, wherein the fluid dispenser, when detached from the handle, provides access to the hollow interior. Mounting the fluid dispenser may include permanently mounting the fluid dispenser, wherein permanently mounting the fluid dispenser seals the handle. The fluid dispenser may include a pump, wherein the pump is operable to deliver the at least one fluid to the scrubber member.

Another aspect of the present disclosure relates to a method of cleaning. The method includes providing a cleaning device comprising a handle filled with a cleaning fluid, and a scrubber assembly, the handle being sealed, mounting the scrubber assembly to the handle, and delivering cleaning fluid to the scrubber assembly.

Mounting the scrubber assembly to the handle may break a seal of the handle to permit flow of the cleaning fluid to the scrubber assembly. The cleaning device may include a fluid dispenser, and the method further includes operating the fluid dispenser to dispense the cleaning fluid. The fluid dispenser may include a pump mounted to the handle, and operating the fluid dispenser includes compressing the pump to increase fluid pressure in the handle. The scrubber assembly may include first and second scrubbing structures, and the method further includes scrubbing with the first scrubbing structure, and scrubbing with the second scrubbing structure. The cleaning device may include a squeegee mounted to the handle, and the method may further include removing fluid with the squeegee. The first scrubbing structure may include a sponge having an abrasive surface, and the second scrubbing structure may include a plurality of bristles. Operating the fluid dispenser may include operating a spray dispenser to spray the cleaning fluid.

A further aspect of the present disclosure relates to a cleaning device that includes a handle and a fluid dispenser. The handle is configured to hold cleaning fluid and have at least one scrubber member mounted thereto. The handle includes a fill hole and an dispensing hole. The fluid dispenser is mounted to the handle at the fill hole and is operable to dispense cleaning fluid through the dispensing hole. The handle may be sealed upon mounting the fluid dispenser to the handle.

The fluid dispenser may be permanently mounted to the handle. The cleaning device may also include a scrubber member releasably mounted to the handle. The cleaning device may also include a film covering the dispensing hole and configured to be removed prior to dispensing fluid from the handle. The film may cover the dispensing hole and be configured to be broken to provide dispensing of the cleaning fluid from the handle.

The preceding description has been presented only to illustrate and describe exemplary embodiments of the system and process. It is not intended to be exhaustive or to limit the system and process to any precise form disclosed. Many modifications and variations are possible in light of the above teaching. It is intended that the scope of the system and process be defined by the following claims.

What is claimed is:

1. A cleaning device, comprising:
   a refillable handle having first and second end portions and a hollow interior configured to hold a cleaning fluid, the handle having first and second track members positioned at the first end portion;
   a scrubbing member arranged in flow communication with the hollow interior, the scrubbing member being configured to slidably mate with the first track member to mount the scrubbing member to the handle;
   a plurality of bristles configured to slidably mate with the second track member to mount the plurality of bristles to the handle; and
   a squeegee mounted to the second end portion of the handle.

2. The cleaning device of claim 1, further comprising a fluid dispenser positioned on the handle and arranged in flow communication with the hollow interior; the fluid dispenser being operable to pump the cleaning fluid into the scrubbing member.

3. The cleaning device of claim 1, wherein the scrubbing member comprises an abrasive surface and the plurality of bristles extend parallel to the abrasive surface.

4. The cleaning device of claim 1, wherein the plurality of bristles are mounted to a bristle base, the bristle base being detachably mounted to the handle.

5. The cleaning device of claim 1, further comprising a fluid dispenser positioned on the handle and arranged in flow communication with the hollow interior, the fluid dispenser comprising a spray dispenser having a spray handle operable to pump the cleaning fluid, a nozzle through which the cleaning fluid is dispensed, and a dip stick extending into the hollow interior.

6. The cleaning device of claim 1, wherein the squeegee is removably mounted to the handle.

7. The cleaning device of claim 1, wherein the squeegee comprises a blade support, a blade, support arms, and an opening between the support arms and the blade support, the opening being configured to receive a support member upon which the cleaning device hangs.

8. The cleaning device of claim 1, wherein the scrubbing member comprises a rigid base portion releasably mounted to the handle, and at least one sponge member mounted to the rigid base portion.

9. The cleaning device of claim 1, further comprising a plurality of latch members configured to connect the scrubbing member and plurality of bristles to the handle.

10. The cleaning device of claim 2, wherein the fluid dispenser is positioned at a location spaced between distal and proximal ends of the handle along an upward facing surface thereof.

11. The cleaning device of claim 3, wherein the fluid dispenser comprises a pump member, the pump member being removable from the handle to permit access to the hollow interior for refilling the handle with cleaning fluid.

12. The cleaning device of claim 8, wherein the at least one sponge member includes a contoured peripheral shape and a planar abrasive surface.

13. A cleaning device, comprising:
   a refillable handle having a hollow interior configured to hold a cleaning fluid;
   a scrubber assembly removably mounted to a first end of the handle and arranged in flow communication with the hollow interior, the scrubber assembly comprising:
   a sponge portion releasably mounted to the handle at a first location; and
   a bristles portion releasably mounted to the handle at a second location, the sponge portion and the bristles portion being slidably mounted to separate track members formed in the first end of the handle;
   a squeegee mounted to a second end of the handle; and
   a pump mounted to the handle and operable to dispense the cleaning fluid into the sponge portion.

14. The cleaning device of claim 13, further comprising a fluid dispenser mounted to a second end of the handle and arranged in flow communication with the hollow interior, the fluid dispenser being configured to dispense the cleaning fluid.

15. The cleaning device of claim 13, wherein the bristles portion includes a bristles base and a plurality of bristles mounted to the bristles base, the plurality of bristles extending from the handle in a direction parallel to a primary cleaning surface of the sponge portion.

16. The cleaning device of claim 13, wherein the sponge portion comprises a sponge base, a sponge member, and an abrasive member.

17. The cleaning device of claim 13, wherein the sponge portion and the bristles portion are independently releasably mounted to the handle.

18. A cleaning device, comprising:
a refillable handle having distal and proximal ends and a hollow interior configured to hold a cleaning fluid, the handle comprising first and second track members positioned at the distal end;
a sponge assembly configured to slidably connect to the first track member; and
a bristles assembly configured to slidably connect to the second track member.

19. The cleaning device of claim 18, further comprising:
a squeegee mounted to the proximal end of the handle.

20. The cleaning device of claim 18, wherein the sponge assembly comprises a sponge member and an abrasive member, the abrasive member defining a planar cleaning surface, and the bristles assembly includes a plurality of bristles that extend from the handle in a direction parallel to the planar cleaning surface of the abrasive member.

21. The cleaning device of claim 18, wherein the sponge assembly comprises a sponge base and a sponge member connected to the sponge base, and the bristles assembly includes a bristles base and a plurality of bristles connected to the bristles base, the sponge base and the bristles base being arranged in parallel with each other.

22. The cleaning device of claim 18, further comprising a pump mounted to the handle and operable to dispense the cleaning fluid into the sponge assembly.

23. The cleaning device of claim 18, further comprising:
at least one first latch member configured to retain the sponge assembly in a mounted position on the handle; and
at least one second latch member configured to retain the bristles assembly in a mounted position on the handle.

24. The cleaning device of claim 23, wherein the at least one first latch member is carried by the sponge assembly, and the at least one second latch member is carried by the bristles assembly.

* * * * *